United States Patent [19]
Yonezawa et al.

[11] Patent Number: 5,553,297
[45] Date of Patent: Sep. 3, 1996

[54] INDUSTRIAL CONTROL APPARATUS

[75] Inventors: Masaaki Yonezawa; Kiyoshi Hasegawa; Yasunori Kawata; Kouji Matsuoka; Takasi Kadowaki, all of Tokyo, Japan

[73] Assignee: Yokogawa Electric Corporation, Musashino, Japan

[21] Appl. No.: 119,322

[22] Filed: Sep. 9, 1993

Related U.S. Application Data

[63] Continuation of Ser. No. 513,454, Apr. 23, 1990, abandoned.

[30] Foreign Application Priority Data

| | | | |
|---|---|---|---|
| Apr. 24, 1989 | [JP] | Japan | 1-104052 |
| May 23, 1989 | [JP] | Japan | 1-129707 |
| Oct. 23, 1989 | [JP] | Japan | 1-275512 |
| Oct. 23, 1989 | [JP] | Japan | 1-275513 |

[51] Int. Cl.$^6$ .................................................. G06F 15/16
[52] U.S. Cl. ........................... 395/800; 364/132; 364/136; 364/DIG. 1
[58] Field of Search ...................... 395/800; 364/131–136

[56] References Cited

U.S. PATENT DOCUMENTS

| | | | |
|---|---|---|---|
| 4,303,990 | 12/1981 | Seipp | 395/740 |
| 4,592,010 | 5/1986 | Wollscheid | 395/800 |
| 4,600,988 | 7/1986 | Tendulkar et al. | 395/550 |
| 4,648,068 | 3/1987 | Ninnemann et al. | 395/281 |
| 4,750,110 | 6/1988 | Mothersole et al. | 395/375 |
| 4,797,811 | 1/1989 | Kiyokawa et al. | 364/474.23 |
| 4,858,101 | 8/1989 | Stewart et al. | 364/131 |
| 4,942,552 | 7/1990 | Merrill et al. | 395/826 |
| 4,972,365 | 11/1990 | Dodds et al. | 395/825 |
| 4,985,831 | 1/1991 | Dulong et al. | 395/650 |
| 5,068,778 | 11/1991 | Kosem et al. | 364/138 |
| 5,068,821 | 11/1991 | Sexton et al. | 395/800 |
| 5,287,548 | 2/1994 | Flood et al. | 395/375 |

OTHER PUBLICATIONS

MC68881/MC68882 Floating–Point Coprocessor User's Manual, 1987, pp. 7–1 to 7–38.
M68000 Family Reference, 1988, pp. –62 to 3–63, 3–66 to 3–67, 4–32 to 4–35, 4–50 to 4–51, 4–6 to 4–6, and 4–74 to 4–75.

*Primary Examiner*—William M. Treat
*Attorney, Agent, or Firm*—Pennie & Edmonds

[57] ABSTRACT

A programmable controller is disclosed that incorporates a sequence control program adapted to input and output information to a variety of local intelligent appliances at a high velocity and a high efficiency in the field of factory automation for efficiently controlling factory production lines or the field of process automation for controlling multiple industrial processes. Provided for this purpose is an improved a change-over system associated with a 1-bit processor and an ordinary processor for executing the sequence control program. Also improved are functions for a user to particularly specify a BASIC program, software/hardware control functions for a group of I/O boards for transferring signals to receiving signals from the local appliances, and the ability to program the internally stored sequence control program.

7 Claims, 29 Drawing Sheets

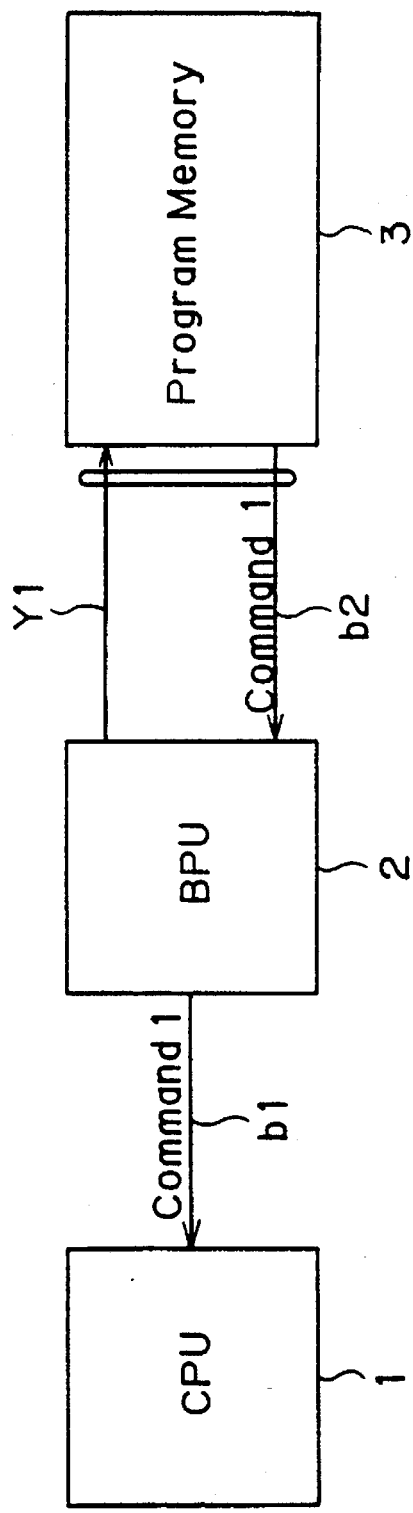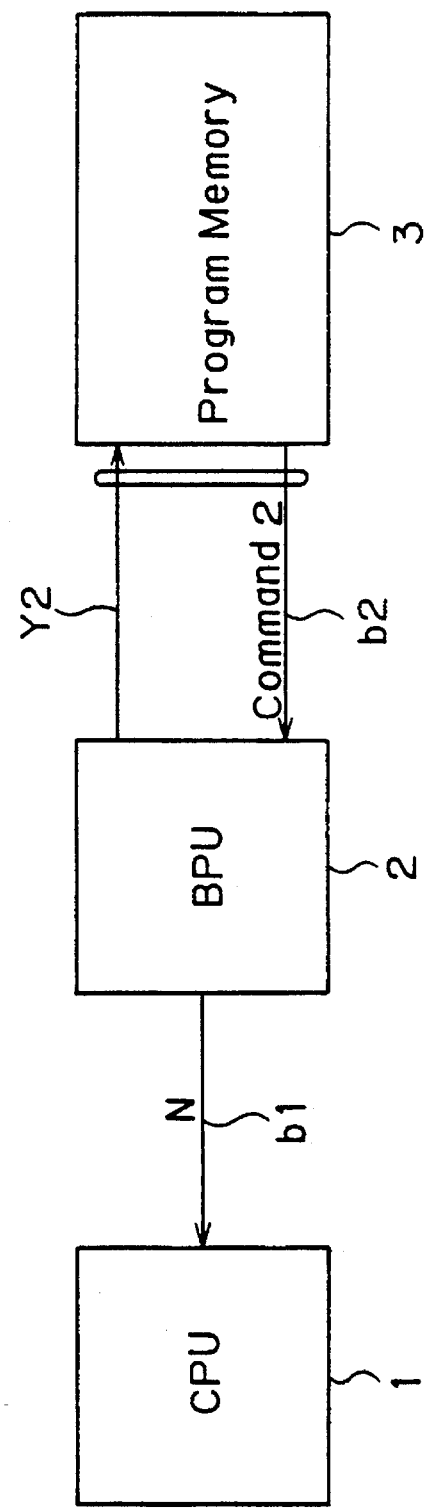

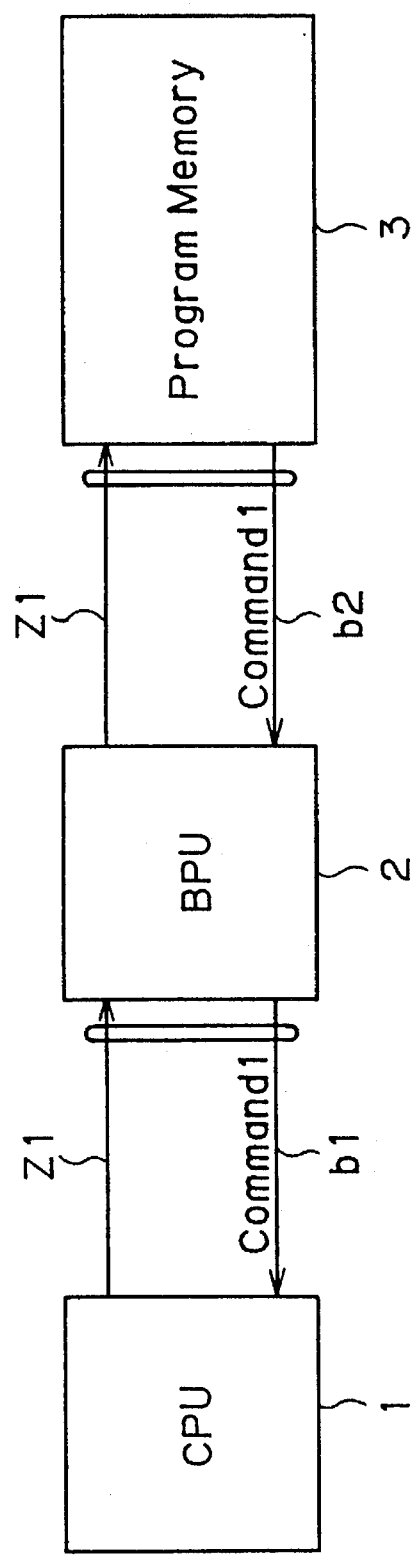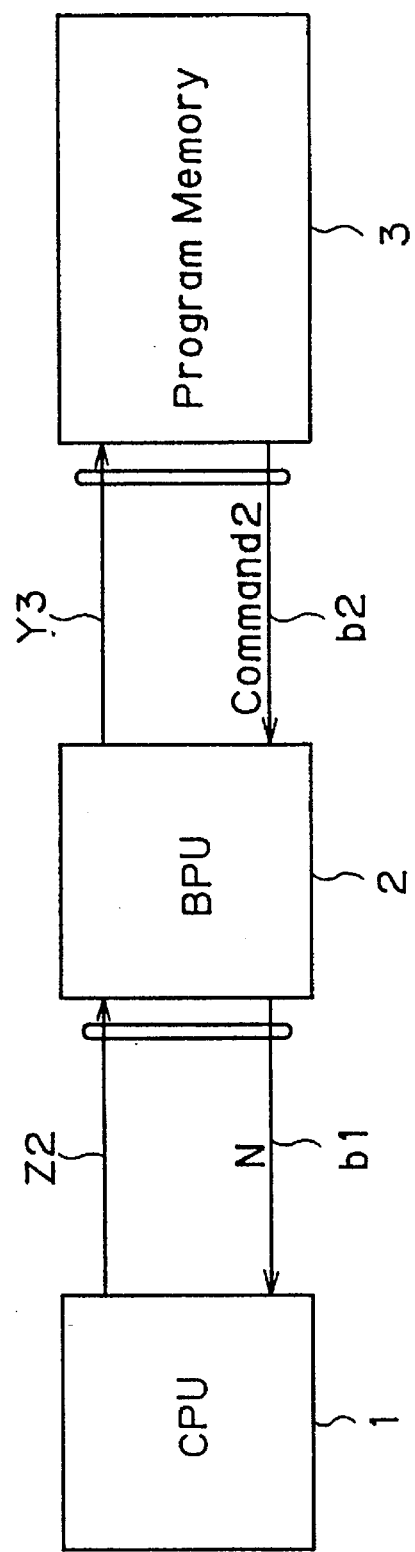

FIG.23

```
89/04/01  09:34:23  CPU1                              Completion of Start-up
89/04/01  09:33:34  CPU1                              Instantaneous Power Outage Occurs
89/04/01  09:33:36  CPU1                              Power Supply Cut-off
89/04/02  09:19:14  CPU1                              Instantaneous Power Outage Occurs
89/04/04  02:19:48  CPU2                              Completion of Start-up
89/04/05  09:21:25  CPU1                              Self-diagnosis Error Diagnosis Number=256
89/04/06  09:36:43  CPU1  SLOT  0                     RS232C Abnormal Error Code=1111
89/04/07  00:17:28  CPU1  SLOT55                      Execution of Reset Process
89/04/08  13:23:58  U*     204      L=01102           Syntax Error
                    f.ABCDEFGH  p.UUUUUUU
89/04/10  04:39:37  U*     E82-E6   L=12882           Time-out
                    f.UUUUUUU   p.SSTTUUVV
89/04/11  00:19:53  U*     E82-E2   L=12882           DEVICE BUSY
                    f.EEEEEEE   p.QQQQQQQ
89/04/30  19:20:21  CPU1 Deterioration of Interrupting Process  E=10 YMAC  00080
89/04/30  18:12:23  CPU1 Deterioration of SEQ Subroutine        E=01 TEST  00012
```

| Start of Display | Stop of Display | | | | | End |

FIG.26

| Step No. | Comment |
|---|---|
| Step 1 | Comment 1 |
| Step 2 | Comment 2 |
| Step 3 | Comment 3 |
| ... | ... |

CF
Comment File

FIG.27

| Step No. | Comment No. |
|---|---|
| Step 1 | 1 |
| Step 2 | 2 |
| Step 3 | 3 |
| ... | ... |

CCT
Circuit/Comment Corresponding Table

SW1 ⟶ X
SW2 ⟶ X
COIL1 ⟶ Y
COIL2 ⟶ Y
IRL1 ⟶ I
TIM1 ⟶ T
CNT1 ⟶ C
REG1 ⟶ D

SW1 ⟶ X001
SW2 ⟶ X002
COIL1 ⟶ Y001
COIL2 ⟶ Y002
IRL1 ⟶ I001
TIM1 ⟶ T001
CNT1 ⟶ C001
REG1 ⟶ D001

```
 10    DO LD1              LD1
 20    DO LD2              LD2
 30    IF COND1 THEN   ⎫
 40       DO LD3        ⎪
 50    ELSE             ⎬  LD3 or LD4
 60       DO LD4        ⎪
 70    ENDIF           ⎭
 80    PARA
 90       DO LD5       ⎫
100    AND              ⎬  LD5 and LD6
110       DO LD6       ⎭
120    ENDPARA
```

INDUSTRIAL CONTROL APPARATUS

This is a continuation of application Ser. No. 07/513,454, filed Apr. 23, 1990, now abandoned.

BACKGROUND OF THE INVENTION

1. Field of the Invention

The present invention is directed generally to a programmable controller, which incorporates a sequence control program, for inputting and outputting information to a variety of local intelligent appliances in an FA (Factory Automation) field for controlling factory production lines or in a PA (Process Automation) field for controlling multiple industrial processes.

The present invention is directed more particularly to an improvement of a change-over system associated with a 1-bit processor and an ordinary processor for executing the sequence control program. The present invention also improves the ability of a user to specify particularly a BASIC program associated with communication with a connected host computer system; the ability to control a group of input/output (I/O) cards for transferring signals to and receiving signals from the local appliances; and the ability to program the sequence control program installed inside the programmable controller.

2. Description of the Prior Art

In general, a central processing unit (CPU) board in a programmable controller is equipped with a typical general purpose processor (e.g., a 16-bit microprocessor such as a Motorola 68000 or the like) serving as a first processor, and a dedicated processor for executing only arithmetic operations or logic (e.g., a math co-processor such as from the Motorola 68000 family or the like), which serves as a second processor. These processors are alternately placed in operation in accordance with a sequence control program stored in a program memory.

FIG. 1 illustrates an example of a module in which the first and second processors operate alternately to read from the single program memory.

In the module depicted in FIG. 1, a first processor CPU 1, typically a general purpose processor (e.g., a 16-bit Motorola 68000 microprocessor), and a second processor BPU (bit processor unit) 2, used as a dedicated processor for executing arithmetic operations or logic (e.g., a math co-processor from the Motorola 68000 family), are connected via an information bus b to a program memory 3. Second processor BPU 2 is sometimes referred to as a 1-bit processor.

Program memory 3 stores machine language commands as program commands for processor CPU 1. Processor CPU 1 executes processing by sequentially reading the machine language commands. When commands read from program memory 3 are to be executed by processor BPU 2, processor CPU 1 transmits the instructions and data to processor BPU 2. Subsequently, the commands read from program memory 3 are sequentially issued to processor BPU 2 to await execution when processor BPU 2 acquires an execution control right.

A disadvantage of this type of prior art programmable controller is that, by utilizing a combination of processors CPU 1 and BPU 2, the system must be designed so that the machine language commands stored in program memory 3 can be allocated to both processors CPU 1 and BPU 2 before the commands can be executed, rather than allocating the commands only to the processor desired for execution.

Other recent prior art designs often utilize interpretive language commands (commands that must be interpreted before they may be executed) designed independently of the machine language commands for processor CPU 1, usually storing these interpretive language commands in program memory 3.

An apparatus making use of interpretive language commands and machine language commands is capable of arbitrarily storing commands to be executed by processor BPU 2 together with commands to be executed by processor CPU 1. There is no need to design the system so that the commands are allocated to both CPU 1 and BPU 2. Instead, processor CPU 1 or BPU 2 is specified in conformity with the contents of the commands read from program memory 3, and it is therefore possible to increase practical efficiency and expand the commands to be executed by the processor BPU 2.

However, there is a disadvantage in employing both machine language commands and interpretive language commands. When BPU 2 operates, processor CPU 1 must sequentially read the program commands from program memory 3 and supply these commands to BPU 2, which results in a time-consuming transfer of the program commands.

There is also a disadvantage when only interpretive language commands are used. Processor CPU 1 must interpret all the commands read from program memory 3 and determine which processor to use for execution of each command. Especially in an apparatus where the operations of processors CPU 1 and BPU 2 are frequently alternated, an excessive delay in processing occurs.

SUMMARY OF THE INVENTION

To obviate the foregoing problems, it is a primary object of the present invention to provide a programmable controller capable of facilitating the alternating operation of the general purpose and dedicated processors and speeding up processing as a whole.

According to one aspect of the invention, a programmable controller is provided that improves not only the internal geometry of CPU boards but also the efficiency of general arithmetic processing, information processing, control operation, BASIC program processing associated with communication with a host computer system, and sequence control program processing.

According to another aspect of the invention, a programmable controller is provided to securely transfer data at a high velocity by improving the ability to transfer the data to a group of I/O cards, which are connected to the CPU boards and are used for transmitting signals to and receiving signals from local appliances.

According to still another aspect of the invention, a programmable controller is provided that is capable of simplifying creation of a sequence control program and also capable of detecting an abnormality either in the operation of the programmable controller itself or in the advancement of the sequence control program.

Other objects and advantages of the present invention will become apparent during the following discussion conducted in conjunction with the accompanying drawings.

BRIEF DESCRIPTION OF THE DRAWINGS

FIGS. 5(a) and 5(b) are block diagrams showing the operation of the apparatus depicted in FIG. 4.

FIGS. 7(a) and 7(b) are block diagrams showing the operation of the apparatus depicted in FIG. 6.

FIG. 23 is a diagram showing an example of information from the abnormality recording module depicted in FIG. 22 being displayed on a CRT of a host computer.

FIG. 26 is a diagram showing an intrafunctional comment file in relation to FIG. 25.

FIG. 27 is an intrafunctional circuit/comment correspondence file in relation to FIG. 25.

DETAILED DESCRIPTION OF THE PREFERRED EMBODIMENTS

First Preferred Embodiment

Figure 1:
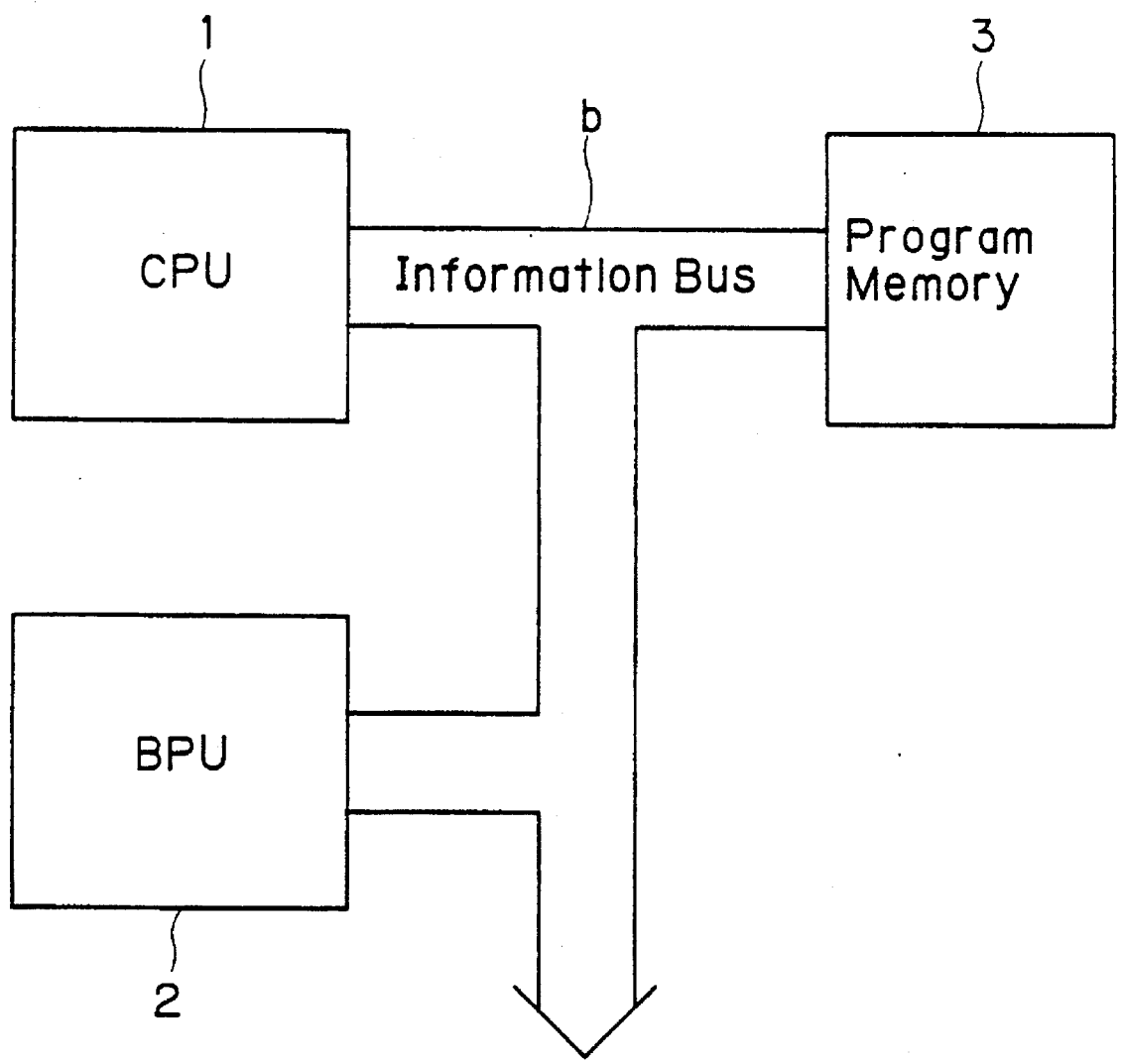
FIG. 1 is a block diagram illustrating a prior art programmable controller.
Figure 2:
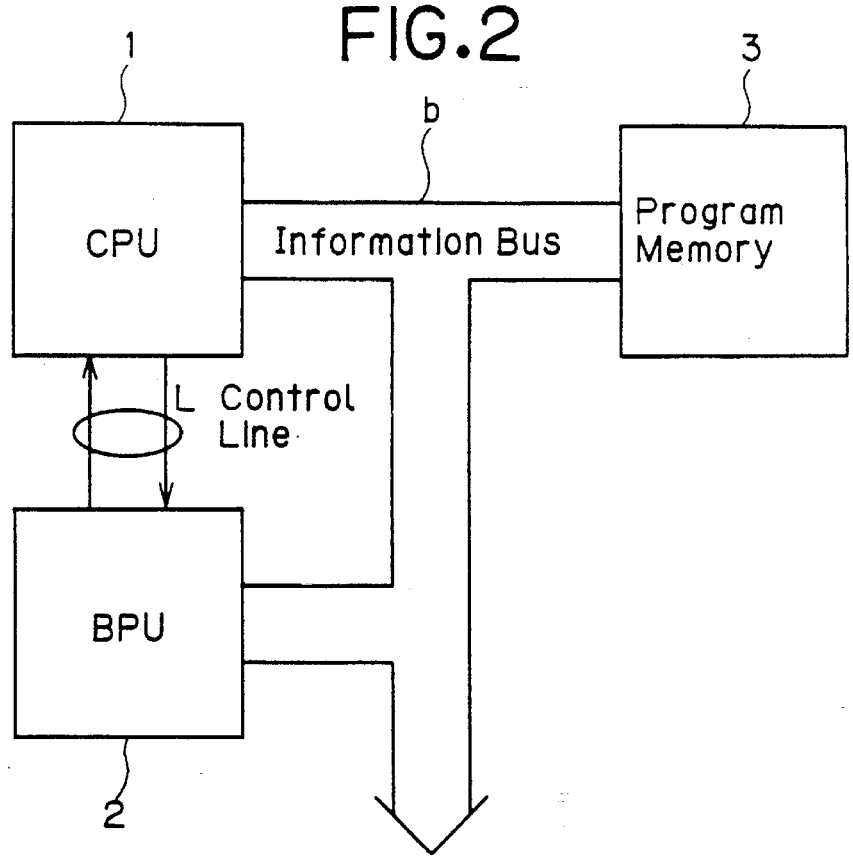
FIG. 2 is a block diagram showing a first embodiment of a programmable controller according to the present invention.

Turning first to FIG. 2, there is illustrated a block diagram of an embodiment of a programmable controller according to the present invention.

One feature of this embodiment is that signals may be transmitted and received between processors CPU 1 and BPU 2 by providing a control line L that is separate from an information bus b.

Processors CPU 1 and BPU 2 send each other starting signals using control line L to enable each processor to read out the contents of addresses of a program memory 3.

Program memory 3 stores a sequence control program comprising both interpretive language commands and machine language commands. Specifically, the sequence control program is composed of sequence basic commands that are in a machine language and used for 1-bit arithmetic operations (e.g., logic operations AND, OR, etc.) to be executed by processor BPU 2, and sequence application commands that are in an interpretive language and used for comparing numeric values, data processing, etc. to be executed by processor CPU 1.

Figure 3:
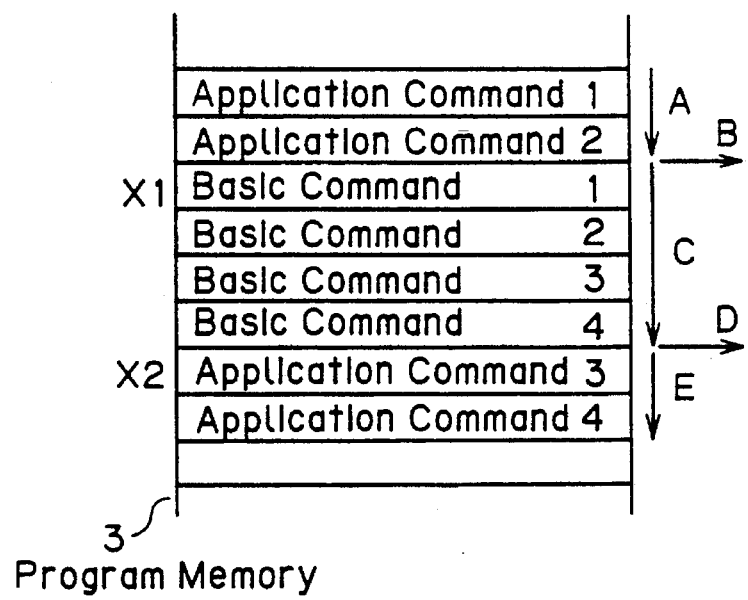
FIG. 3 is a diagram showing an example of the contents of program memory 3 for explaining operations of the apparatus depicted in FIG. 2.

The operation of such an apparatus will now be described with reference to the diagram of FIG. 3, which provides an example of the contents of program memory 3. Application commands 1 to 4 are interpretive language commands for processor CPU 1, while basic commands 1 to 4 are machine language commands for processor BPU 2.

Processor CPU 1 sequentially reads application commands 1 and 2 from program memory 3 in the order indicated by arrow A. Processor CPU 1 interprets and then executes these commands.

Next, CPU 1 reads basic command 1 (arrow B) at address X1 and attempts to interpret this command. Because it is determined to be a command for BPU 2, processor CPU 1 transmits a start signal to BPU 2 via control line L and transmits address X1 of program memory 3 to BPU 2 via information bus b.

As a result, processor BPU 2 obtains a right of use for information bus b and then executes, as indicated by arrow C, basic commands 1 to 4 beginning at address X1 of program memory 3, which address was received from CPU 1.

Unlike the prior art apparatus, BPU 2 does not receive the basic commands via CPU 1 but instead reads basic commands 1 to 4 directly from program memory 3. The basic commands are in the machine language of processor BPU 2, and thus can be executed immediately without being interpreted.

Next, processor BPU 2 reads application command 3 at address X2 and determines that this command should be executed by CPU 1 (arrow D). Processor BPU 2 then transmits a start signal to CPU 1 via control line L and transmits address X2 of program memory 3 via information bus b.

As a result, processor CPU 1 acquires the right of use for information bus b and then reads the commands beginning at address X2 of program memory 3 and executes the commands in sequence (arrow E).

Processors CPU 1 and BPU 2 thus transmit and receive starting signals and the addresses of program memory 3 via control line L and information bus b, respectively, and operate alternately. In particular, BPU 2 reads the commands not through CPU 1 but directly from program memory 3, thereby making high-speed processing possible.

As discussed above, processor BPU 2 does not need to interpret the machine language sequence basic commands before executing them, thus further speeding total processing.

Second Preferred Embodiment

Figure 4:
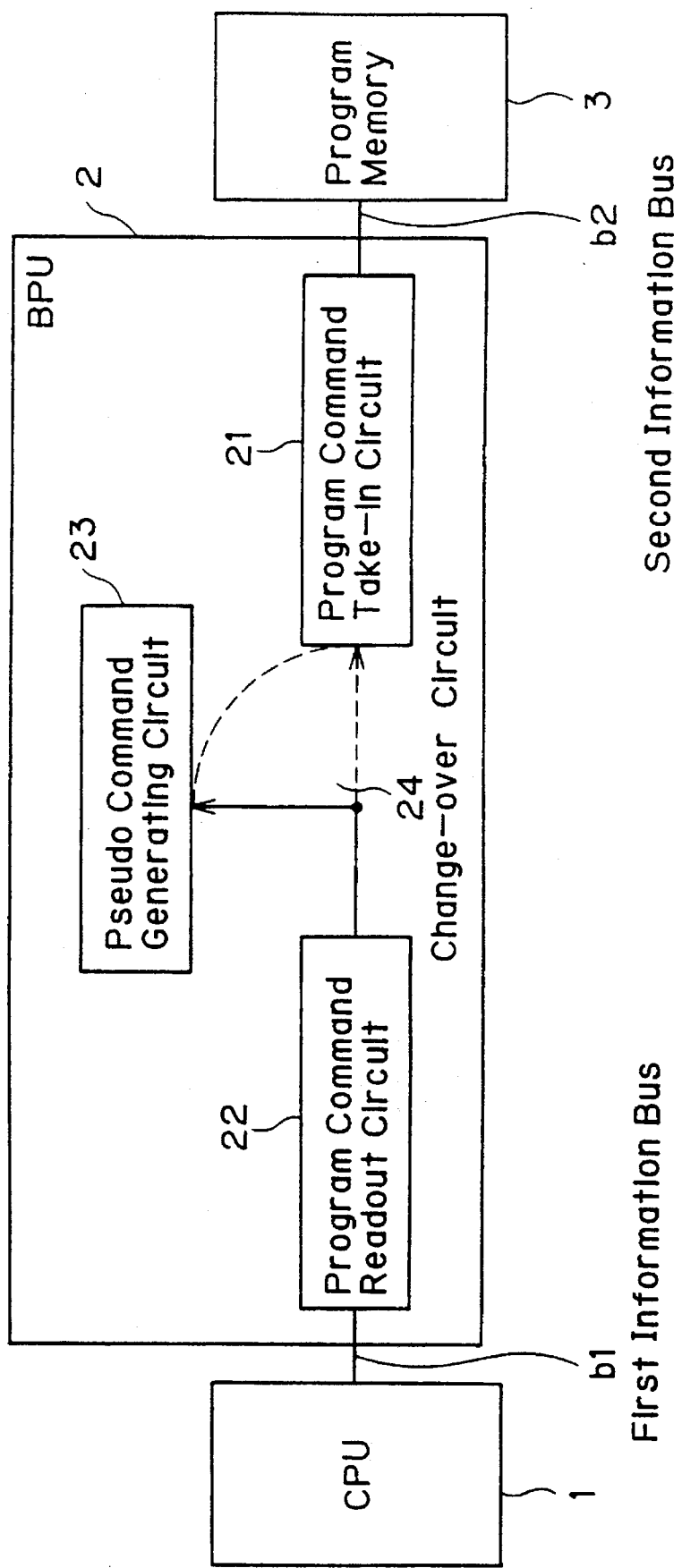
FIG. 4 is a block diagram illustrating a second embodiment of a programmable controller according to the present invention.

Turning next to FIG. 4, there is shown another embodiment of a programmable controller according to the present invention.

In this embodiment, CPU 1 is connected via a first information bus b1 to BPU 2, which is in turn connected via a second information bus b2 to program memory 3.

Processor BPU 2 incorporates a program command take-in circuit 21, which is connected to program memory 3 via information bus b2; a program command readout circuit 22, which is connected to CPU 1 via information bus b1; and a pseudo command generating circuit 23 for storing a pseudo command representing "no execution" by CPU 1. Program command readout circuit 22 includes a change-over circuit 24 for selecting program command take-in circuit 21 or pseudo command generating circuit 23.

As in the embodiment of FIG. 2, program memory 3 stores both interpretive language application commands for CPU 1 and machine language basic commands for BPU 2.

The operations of this embodiment of the invention will be explained with reference to FIGS. 5(a) and 5(b).

FIG. 5(a) illustrates a case where CPU 1 executes the commands. Processor BPU 2 determines that command 1 read at address Y1 is to be executed by CPU 1 and switches change-over circuit 24 to program command take-in circuit 21 within the dedicated processor BPU 2. Command 1 is read and transmitted via program command readout circuit 22 to processor CPU 1, which in turn starts operating.

Note that the commands are read from the contents of the addresses of program memory 3 by BPU 2, even though the commands are executed by CPU 1.

Turning to FIG. 5(b), there is shown a case where BPU 2 executes the commands.

Processor BPU 2 determines that it is to process command 2 read at address Y2, so pseudo command circuit 23 is connected to program command readout circuit 22 via change-over circuit 24. With this arrangement, BPU 2 reads the command from the program memory 3 in accordance with the address generated by BPU 2 and then executes the command, while CPU 1 performs no operation in accordance with a pseudo command N representing "no execution", which is transmitted from BPU 2.

In this manner, the commands read from program memory 3 are transmitted to CPU 1 or BPU 2, thereby smoothly alternating between CPU 1 and BPU 2 without wasting time.

In the example shown in FIG. 4, processor BPU 2 is positioned between CPU 1 and program memory 3. However, another equivalent arrangement is that CPU 1 may be positioned between BPU 2 and program memory 3 by providing circuitry in CPU 1 that corresponds to program command take-in circuit 21, program command readout circuit 22, pseudo command generating circuit 23, and change-over circuit 24.

In either the example of FIG. 4 or the modification, one processor that is positioned between the other processor and program memory 3 acts to generate addresses from program memory 3. Thus, even after changing the processor which is to execute the command, the one processor positioned between the other processor and program memory 3 is constantly aware of the continuing program execution, and it is therefore possible to omit a period for transmitting and receiving the addresses between program memory 3 and the other processor.

Figure 6:
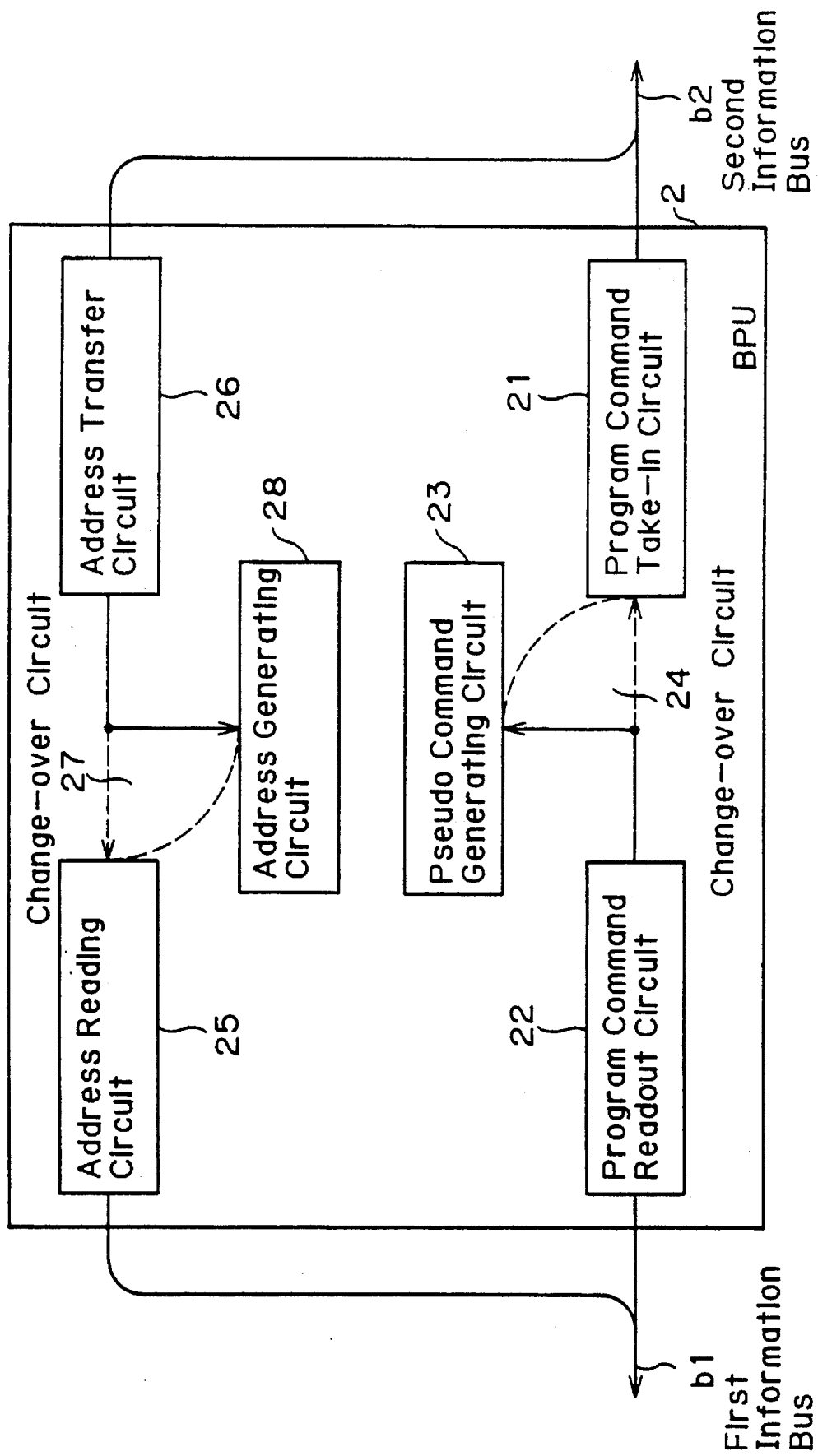
FIG. 6 is a block diagram illustrating an apparatus that is a modification of the second embodiment shown in FIG. 4.

Turning now to FIG. 6, there is shown another modification of the embodiment of FIG. 4. In this arrangement, addresses generated by CPU 1 in the embodiment of FIG. 4 can be sent to program memory 3.

In this example, processor BPU 2 additionally incorporates an address reading circuit 25 for receiving addresses generated by CPU 1 and transmitted on information bus b1; an address transfer circuit 26 for transmitting an address from CPU 1 to program memory 3 via information bus b2; and a change-over circuit 27. Change-over circuit 27 serves to connect address transfer circuit 26 either to address reading circuit 25 or to an address generating circuit 28 provided in the dedicated processor BPU 2.

Operations of this embodiment will be described below in conjunction with FIGS. 7(a) and 7(b).

FIG. 7(a) illustrates a case where CPU 1 executes the commands. Change-over circuit 24 incorporated in BPU 2 is connected to program command take-in circuit 21, while change-over circuit 27 is connected to address reading circuit 25. An address Z1 generated in CPU 1 is transferred via BPU 2 to program memory 3, and a command 1 corresponding thereto passes through BPU 2 and is transmitted to CPU 1.

FIG. 7(b) shows a case where BPU 2 executes the commands. Change-over circuit 24 incorporated in BPU 2 is connected to pseudo command generating circuit 23, while change-over circuit 27 is connected to address generating circuit 28. Processor BPU 2 uses address generating circuit 28 to generate an address Y3. BPU 2 then reads and executes a command 2 from address Y3 of program memory 3, while CPU 1 executes no operation after reading a pseudo command N from BPU 2.

The arrangement exemplified in FIG. 6 makes CPU 1 accessible to an arbitrary location of program memory 3 and is also advantageous when executing a jump command or the like.

Thus, in accordance with the embodiment shown in FIG. 4 or FIG. 6, processors CPU 1 and BPU 2 operate alternately in conformity with the commands read from program memory 3. Again, BPU 2 reads the commands directly from program memory 3, and thus high-speed processing is practicable. Because the basic commands are in the machine language of BPU 2, those commands need not be interpreted before execution by BPU 2, therefore further speeding total processing.

Third Preferred Embodiment

Figure 8:
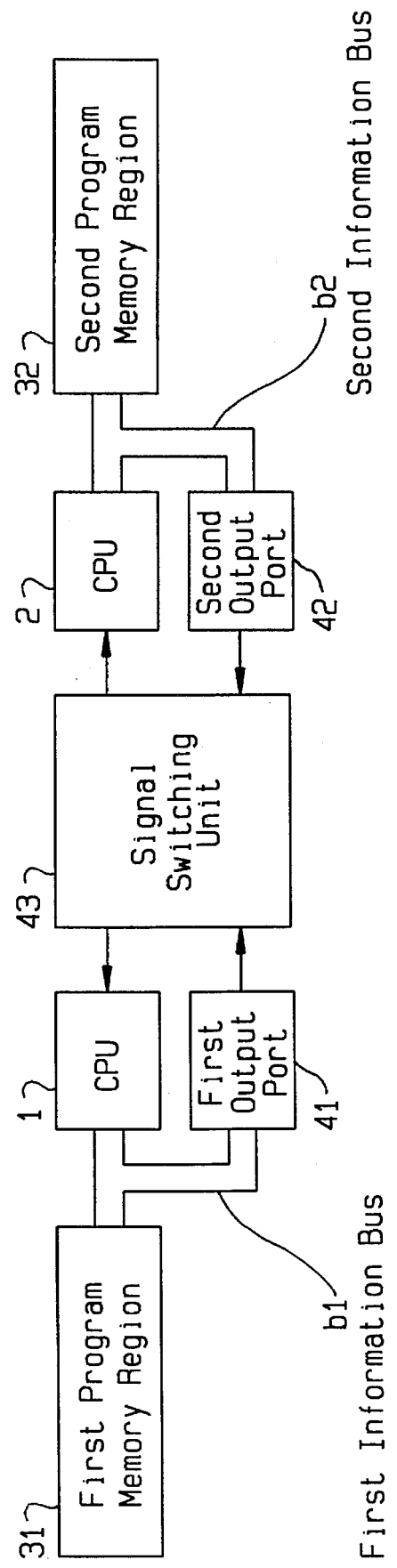
FIG. 8 is a block diagram showing a third embodiment of a programmable controller according to the present invention.

Referring to FIG. 8, there is illustrated another embodiment of a programmable controller according to the present invention.

In this embodiment, CPU 1 is connected via information bus b1 to a first program memory region 31 in which only application commands are stored. Connected via information bus b2 to BPU 2 is a second program memory region 32 in which only basic commands are stored. A first output port 41 is connected to information bus b1, while a second output port 42 is connected to information bus b2. Outputs from output ports 41 and 42 are transmitted to a signal switching unit 43, which in turn gives instructions for initiating or stopping operations to CPU 1 and BPU 2.

Figure 9A:
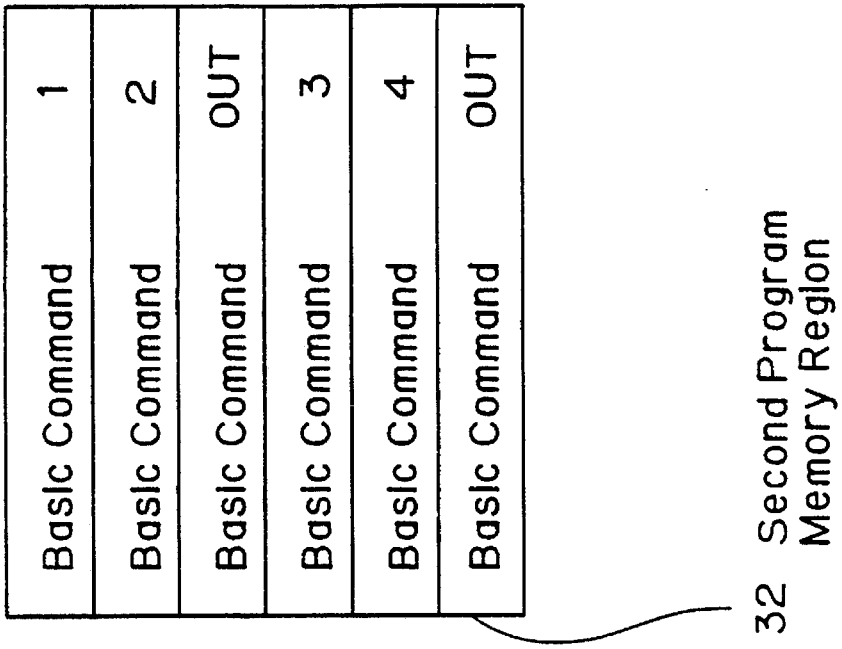
FIGS. 9(a) and 9(b) are diagrams showing examples of the contents of first and second program memory regions 31 and 32 depicted in FIG. 8.
Figure 9B:
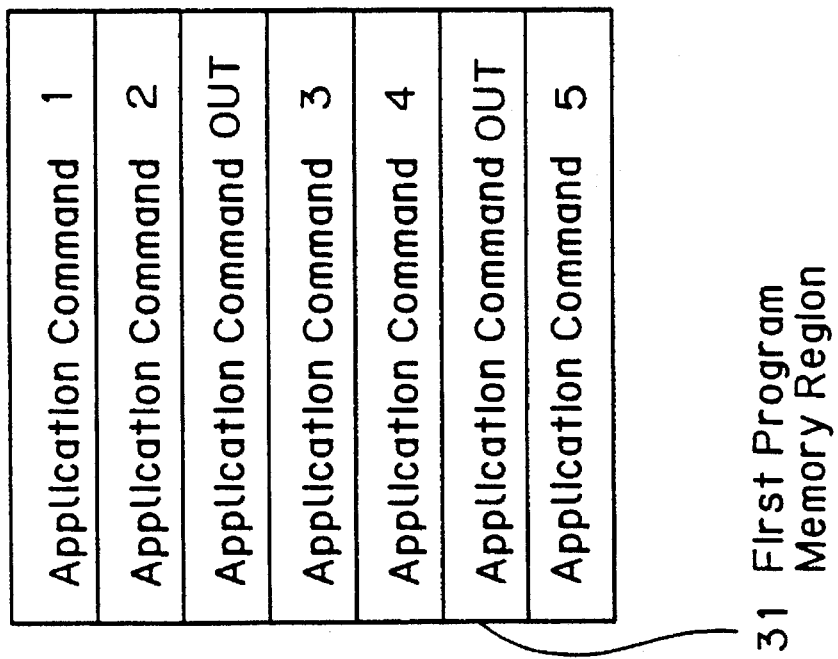

FIGS. 9(a) and 9(b) show examples of the contents of program memory regions 31 and 32. Program memory region 31 stores application commands 1 to 5 and two application commands OUT for instructing BPU 2 to initiate operation, while program memory 32 stores basic commands 1 to 4 and two basic commands OUT for instructing CPU 1 to initiate operation.

The operation of this embodiment will be described as follows. Assume that processor CPU 1 is to execute instructions. In this case, signal switching unit 43 issues an operation starting instruction to CPU 1 while giving an instruction for stopping operation to BPU 2.

Processor CPU 1 sequentially reads and then executes application commands 1 and 2 from program memory 3. Subsequently, CPU 1 reads the application command OUT for issuing an operation starting instruction to BPU 2 and transmits this command to output port 41.

The signal switching unit 43 reads signals from output port 41 and recognizes the application command OUT, at which time CPU 1 receives an instruction for stopping operation while the operation starting instruction is given to BPU 2.

As a result, BPU 2 initiates operation and executes each basic command after reading it from program memory region 32. In this example, after basic command 2 is executed, the basic command OUT is read. The basic command OUT is then transmitted to output port 42.

Signal switching unit 43 reads signals from output port 42 and recognizes the basic command OUT. Then, signal synthesizing unit 43 gives an operation stopping instruction to BPU 2 and an operation starting instruction to CPU 1. Consequently, CPU 1 resumes operation.

In this manner, the operations of CPU 1 and BPU 2 are smoothly alternated by means of signal switching unit 43.

Figure 10B:
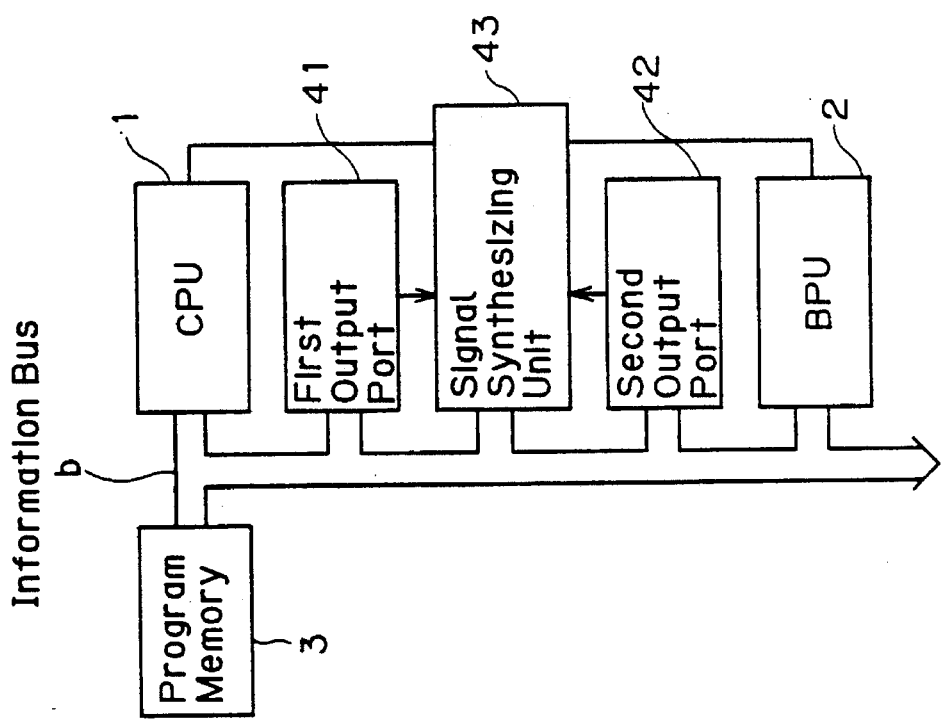
FIGS. 10(a) is a block diagram and FIG. 10(b) is a diagram showing memory contents that illustrate an apparatus that is a modification of the third embodiment of FIG. 8.
Figure 10A:
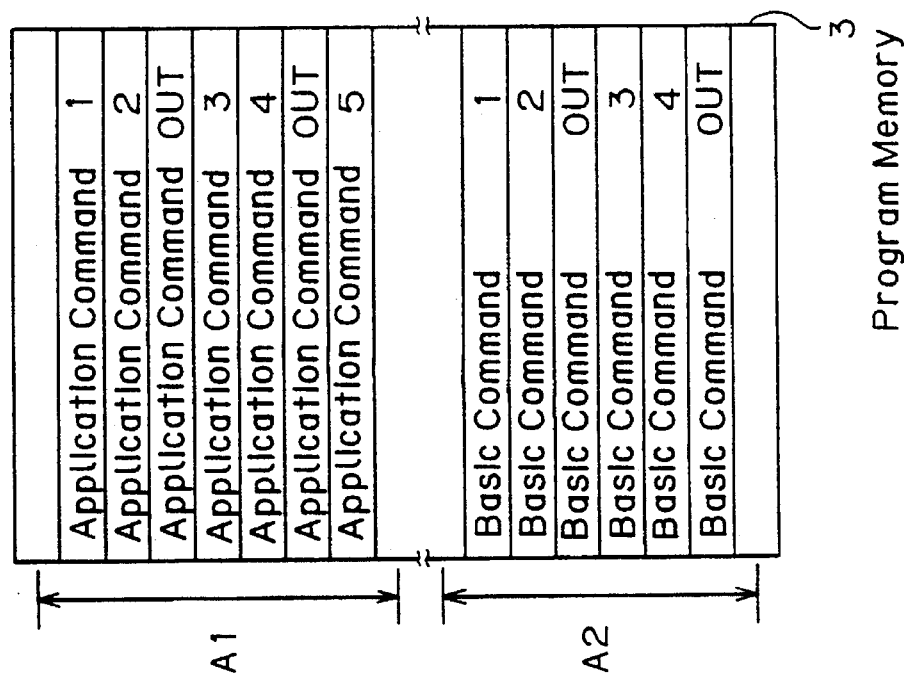

FIGS. 10(a) and 10(b) show a modification of the embodiment of FIG. 8, in which output ports 41 and 42 and signal synthesizing unit 43 are connected to one information bus b.

In this example, program memory 3 is configured, as depicted in FIG. 10(b), with an interprogram memory region A1 for storing only application commands and an interprogram memory region A2 for storing only basic commands.

The operation of this embodiment is substantially the same as that of the apparatus depicted in FIG. 8. In the manner discussed above, processors CPU 1 and BPU 2 operate alternately in conformity with the commands read from interprogram memory regions A1 and A2, analogous to reading from program memory regions 31 and 32 of the embodiment shown in FIG. 8. Again, BPU 2 reads the commands for the dedicated processor directly from memory, which permits high-speed processing.

Again, because the basic commands are in the machine language of BPU 2, no interpretation of the instructions is required before execution by BPU 2, thus speeding total processing.

Figure 11:
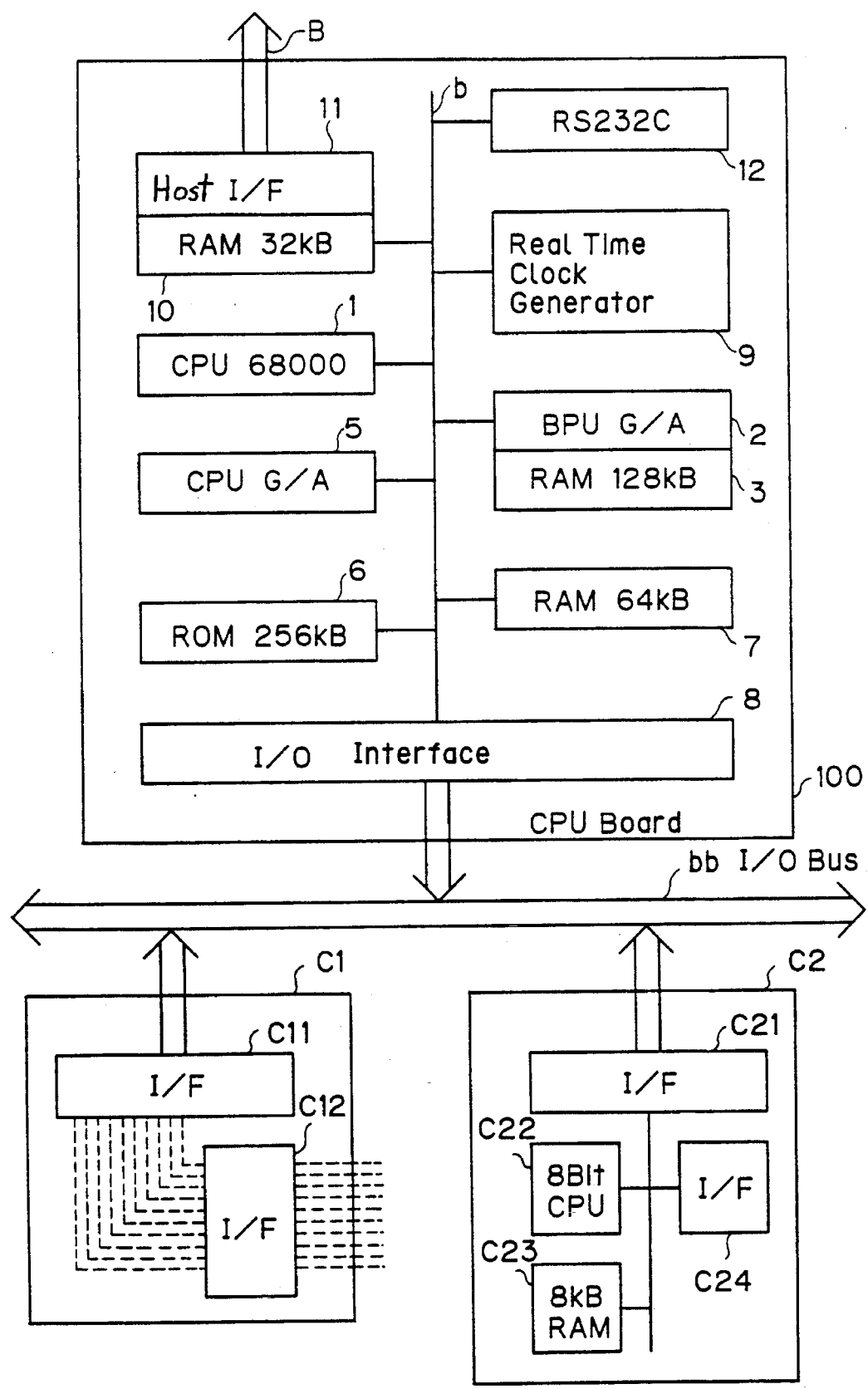
FIG. 11 is a block diagram illustrating a processor board incorporating a programmable controller according to the present invention and connected to a plurality of I/O boards.

FIG. 11 depicts an example of a programmable controller according to the present invention as part of a processor board connected to a plurality of I/O boards.

Referring to FIG. 11, CPU 1, BPU 2, and program memory 3 are connected to information bus b in a CPU board 100. (Note that information bus b includes an address bus, a data bus and a control bus, none shown). To be more specific, CPU 1 is a microprocessor (e.g., MC68000 or the like), for controlling CPU board 100 as a whole. Microprocessor CPU 1 is disposed in parallel with BPU 2, which is also connected to information bus b and executes sequence basic commands (1-bit processing commands). A CPU gate array (G/A) 5 outputs control timing signals so that CPU 1 executes instructions with high efficiency.

BPU 2 is constructed of a gate array to process the 1-bit processing sequence basic commands at a high velocity, and is connected via a command bus (not illustrated) directly to program memory 3 (e.g., 128 KB RAM) for storing a sequence control program such as a ladder program or the like.

A variety of commands to be executed by CPU 1 for controlling the entire board are stored in a ROM 6 (e.g., 6 KB ROM). A data memory 7 (e.g., 64 KB RAM) is an operating region of CPU 1 into which a BASIC program that will be described later is stored.

An I/O interface 8 is provided for an I/O bus bb, which is connected to I/O boards C1 and C2. Although two I/O boards are depicted in FIG. 11, any number may be used depending on the system configuration.

Also connected to information bus b are a real time clock generator 9 used as a timer, a communication buffer 10 (e.g., 32 KB RAM) used for communication, and a host interface (I/F) 11 connected to communication buffer 10 and serving as an interface to a host bus B. An RS232C port 12 is also provided for communication with a programming tool.

As shown in FIG. 11, connected to I/O bus bb are a plurality of I/O boards of two kinds, i.e., a general register/interface type I/O board C1, and a command/interface type I/O board C2 (incorporating a microprocessor) for effecting communication by transferring commands to and receiving them from CPU board 100. It is also possible for a system to be constructed having only one I/O board of either kind.

The register/interface type I/O board C1 is composed mainly of an interface (I/F) C11 to I/O bus bb and an interface C12 to a local appliance. The I/O board C2 consists of an interface C21 to I/O bus bb, a microprocessor C22 (e.g., an 8-bit CPU), a data memory C23 (e.g., 8 KB RAM), and an interface C24 to a local appliance.

In a CPU board 100 constructed according to the geometry depicted in FIG. 11, BPU 2 performs a direct access to program memory 3 not through information bus b but through the command bus (not shown) between them. The functions of CPU board 100 will be described with reference to FIGS. 12 and 13.

Figure 12:
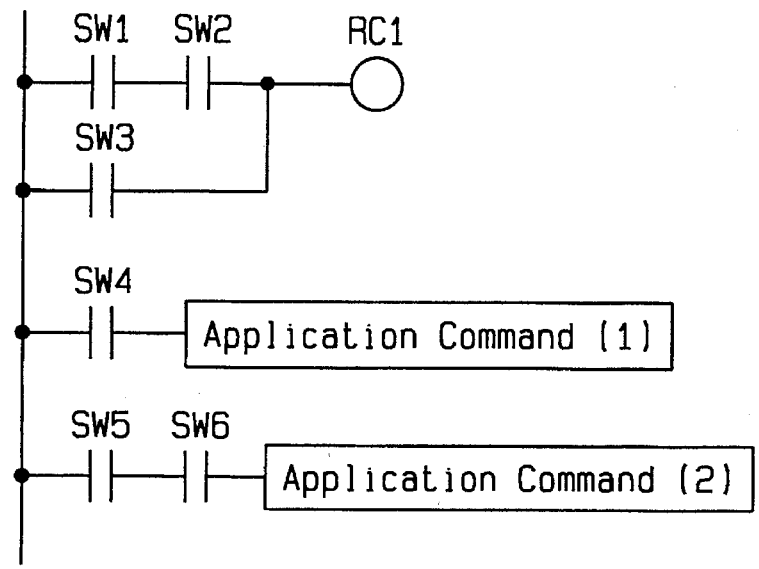
FIG. 12 is a diagram showing a ladder program for explaining the operation of a programmable controller according to the present invention.
Figure 13:
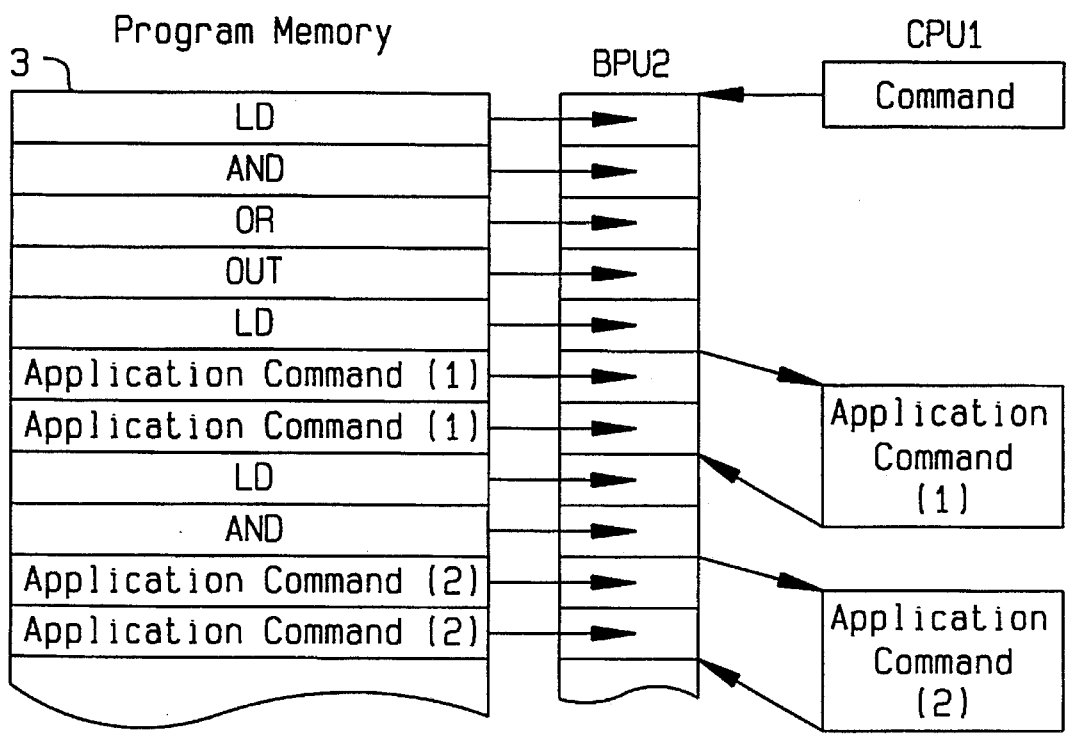
FIG. 13 is a diagram of assistance in explaining the operation of processors CPU 1 and BPU 2 of a programmable controller according to the present invention.

FIG. 12 illustrates a ladder program as an example of a sequence control program. FIG. 13 shows an example of a string of program commands corresponding to the ladder program. The ladder program shown in FIG. 12 is typically constructed by electronically assembling picture elements (symbols) on a CRT display screen with a CAD editing program. The ladder program picture elements are then compiled into a string of program commands and stored in program memory 3 as shown in the example of FIG. 13.

The ladder program of FIG. 12 comprises contact ON/OFF signals SW1 to SW6, a relay coil output signal RC1, and application commands (1) and (2). The commands in program memory 3 are executed as follows. In accordance with a load command "LD", the ON/OFF state of SW1 is read. Next, in accordance with an "AND" command, an arithmetic AND operation is carried out on SW1 and the state of SW2. Then, in accordance with an "OR" command, an arithmetic OR operation is carried out on the result of the previous operation and the state of SW3. According to an "OUT" command, a relay coil is driven by output signal RC1. In accordance with the next LD command, the ON/OFF state of SW4 is read. If it is ON, application command (1) is carried out. According to another LD command, the ON/OFF state of SW5 is read. In accordance with the AND command that follows, an arithmetic AND operation is carried out on the states of SW5 and SW6; if the result of that operation is ON, application command (2) is carried out.

The operation of the processors in executing the commands shown in FIG. 13 is as follows. When starting the sequence control, CPU 1 actuates BPU 2, which in turn reads a string of program commands from program memory 3 and then initiates processing, in this example by executing load command LD, which is a sequence basic command.

Next, BPU 2 executes an AND command, an OR command, an OUT command, and a LD command. When the program command read is application command (1), which is to be executed by CPU 1, CPU 1 takes over a control executing right from BPU 2, including a right for occupying the address bus and the data bus. Application command (1) is then executed by CPU 1. (Note that application commands in this example use double the memory area of sequence basic commands.) Upon completing the processing of application command (1), CPU 1 informs BPU 2 of the completion and BPU 2 reads the next command.

In this example, the next program command that BPU 2 reads is a load command LD, so BPU 2 executes this command by itself. This process continues for the next in the sequence of instructions in program memory 3, an AND command, until application command (2) is read, at which time BPU 2 transfers the control executing right to CPU 1. Again, when execution is completed, BPU 2 is notified.

In sum, BPU 2, which executes the sequence basic commands, reads all commands in sequence from a program of commands stored in program memory 3. When the command read is a sequence application command to be executed by CPU 1, CPU 1 takes over the control executing right from BPU 2. CPU 1, after executing the command, merely sends back a termination notice to BPU 2. Normally, as in the example given above, a great majority of the program commands are sequence basic commands. Thus, an arrangement according to the present invention can increase the processing speed of BPU 2.

If the program command read by BPU 2 is a false command (undefined in the system), BPU 2 supplies CPU 1 with one of a set of predefined pseudo commands that corresponds to the form of the false command. This pseudo command is chosen so as to exert no adverse influence on the system when executed by CPU 1.

When CPU 1 starts performing the sequence control process in this manner, BPU 2 reads the program command from program memory 3 and starts executing the command. Because BPU 2 reads the program command directly from program 3, there is no need for CPU 1 to read the program commands one by one or to set the control executing right.

Figure 14:
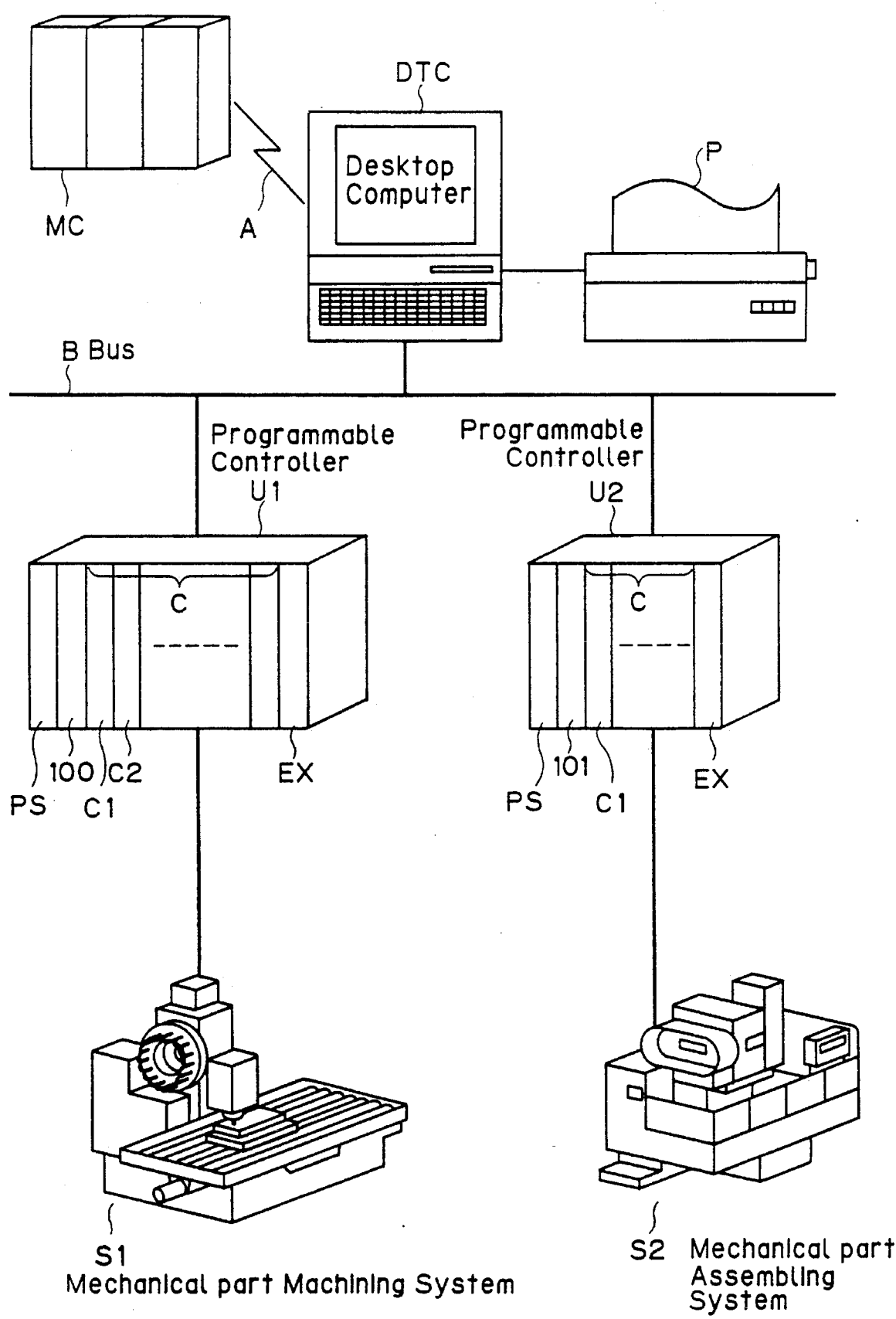
FIG. 14 depicts a system that employs a programmable controller according to the present invention.

FIG. 14 shows an example where a programmable controller consisting of CPU board 100 and a plurality of I/O boards is applied to the field of factory automation.

In the system depicted in FIG. 14, a programmable controller U1 controls a mechanical part machining system S1, inputting signals from and outputting signals to system S1, while a programmable controller U2 similarly exercises control over a mechanical part assembling system S2. The programmable controllers U1 and U2 communicate via a bus B with a desktop computer DTC (which includes a printer P) capable of informing an operator of system conditions. Desktop computer DTC is managed by a host computer MC, such as a minicomputer or mainframe computer, through a communication line A.

Programmable controllers U1 and U2 perform sequence control operations such as a contact I/O process, motor driving/stopping processes, a part positioning process, and lamp lighting/extinguishing processes with respect to systems S1 and S2. Each of programmable controllers U1 and U2 contains a plurality of I/O boards C.

Programmable controller U1 will be used to explain the operation of this system. Programmable controller U2 has much the same construction and operations as those of programmable controller U1.

Programmable controller U1 comprises elements depicted in FIG. 11: CPU board 100 and I/O boards C1 and C2 fitted in inter-unit slots, the controller U1 having an internal bus (I/O bus bb). Additional components are a power supply board PS for supplying electric power and an extension board EX, which participates in communications with the other programmable controller U2.

In this arrangement, a sequence control program adapted to mechanical part machining system S1 is incorporated into CPU board 100 of programmable controller U1, allowing a sequence of arithmetic operations to be executed on the basis of information from an I/O board. Control signals are transmitted via the I/O board to mechanical part machining system S1, thereby executing a desired sequence of operations by system S1.

The sequence control program can be transmitted to a program creating tool. In this example, a ladder program is transmitted to CPU board 100 in an edit format used for viewing the program on a CRT display of desktop computer DTC.

Program processing in CPU board 100 and processing by the I/O board will next be described in greater detail.

CPU 1 executes the sequence control program and at the same time carries out quite typical operations such as communication of multiple data with a host computer, arithmetic operations for general purposes, information processing, etc. A BASIC program created by a user for carrying out these typical operations is stored in CPU board 100. Described below are procedures for coordinating execution of the BASIC program with execution of the sequence control program.

Figure 15:
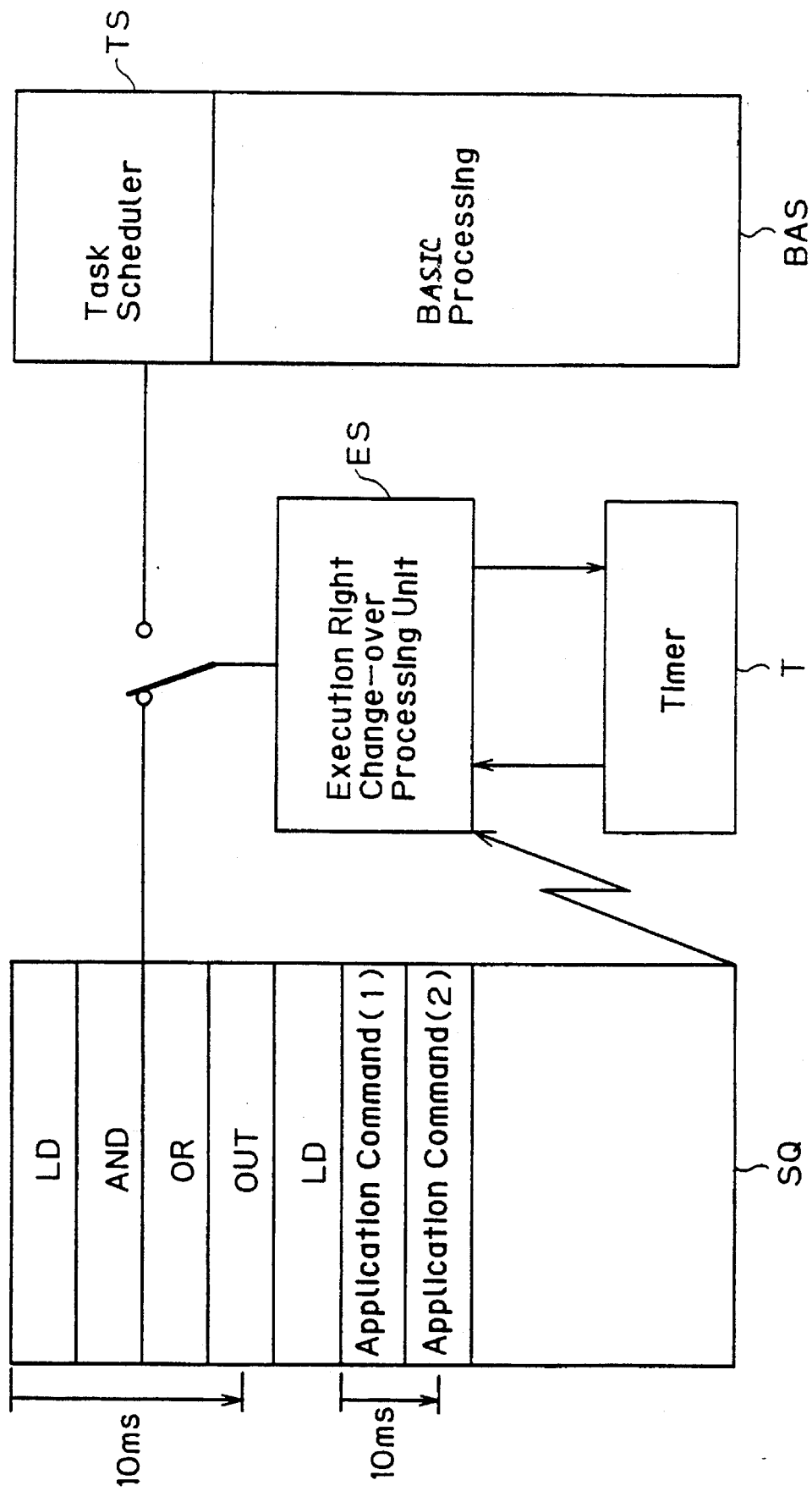
FIG. 15 is a block diagram showing a correlation between BASIC processing and sequence control processing of a programmable controller according to the present invention.

FIG. 15 is a diagram representing a software program in CPU board 100 that carries out parallel operations of sequence control processing SQ and BASIC processing BAS.

Sequence control processing SQ is intended to execute a string of program commands such as those shown in FIGS. 12 and 13, while BASIC processing BAS is associated with a data readout program which is particularly created by the user, or is a standard communication program, written in BASIC. An execution right change-over processing unit ES, a timer T, and a task scheduler TS have functions which are defined by software stored inside CPU board 100. Task scheduler TS functions to determine the priority for execution with respect to several processes in the BASIC processing program. This function is not, however, directly associated with the operations of the present invention.

It should be noted that generally several hundreds or several thousands of sequence control program commands are provided, and the execution time of one cycle of that program is several tens or hundreds of milliseconds (ms), depending largely on the configuration of the system to be controlled. For this example, regardless of what the execution time for one cycle is, it will be assumed that 10 ms is the time set in timer T. The time set in timer T is not limited to 10 ms but may be arbitrarily set depending on the system configuration.

As shown in the example of FIG. 15, the first step of sequence control processing SQ is to execute a load command LD. Subsequently, the execution moves to an AND command, an OR command, and an output command (OUT), at which time 10 ms passes. Then, a time-up signal is transmitted as an interrupt signal from timer T to execution right change-over processing unit ES. CPU 1 inputs this interrupt signal, but at this time the control executing right is still held by BPU 2. As a result, CPU 1 is unaffected by this time-up interrupt.

The sequence processing further advances, and BPU 2 executes load command LD. By the time the next 10 ms time-up interrupt signal is transmitted, the control executing right has been handed over to CPU 1 for execution of application command (1). Consequently, execution right change-over processing unit ES changes the processing which is to be executed by CPU 1 from sequence processing SQ to BASIC processing BAS. Thus, CPU 1 starts processing BASIC processing program BAS in accordance with task scheduler TS. Execution of sequence control processing SQ remains stopped.

Thereafter, timer T is again brought into a time-up state, and another 10 ms interrupt signal is generated. At this time, execution right change-over processing unit ES in CPU 1 temporarily stores the present conditions of the BASIC program (e.g., values of registers, value of a program counter, etc.) in data memory 7 (shown in FIG. 11), and causes the operation of sequence control processing SQ, which had been stopped, to resume.

When execution of sequence control processing SQ is completed, sequence control processing SQ transmits a notice of completion to execution right change-over processing unit ES, irrespective of whether a time-up signal has been issued, and CPU 1 initiates or resumes execution of BASIC processing BAS.

In sum, the system operates by alternating execution of sequence control processing SQ and BASIC processing BAS every 10 ms while CPU 1 has the execution right. As a result, sequence processing SQ and BASIC processing BAS appear to the user as if they were being executed simultaneously. Hence, multi-processing is practicable.

Figure 16:
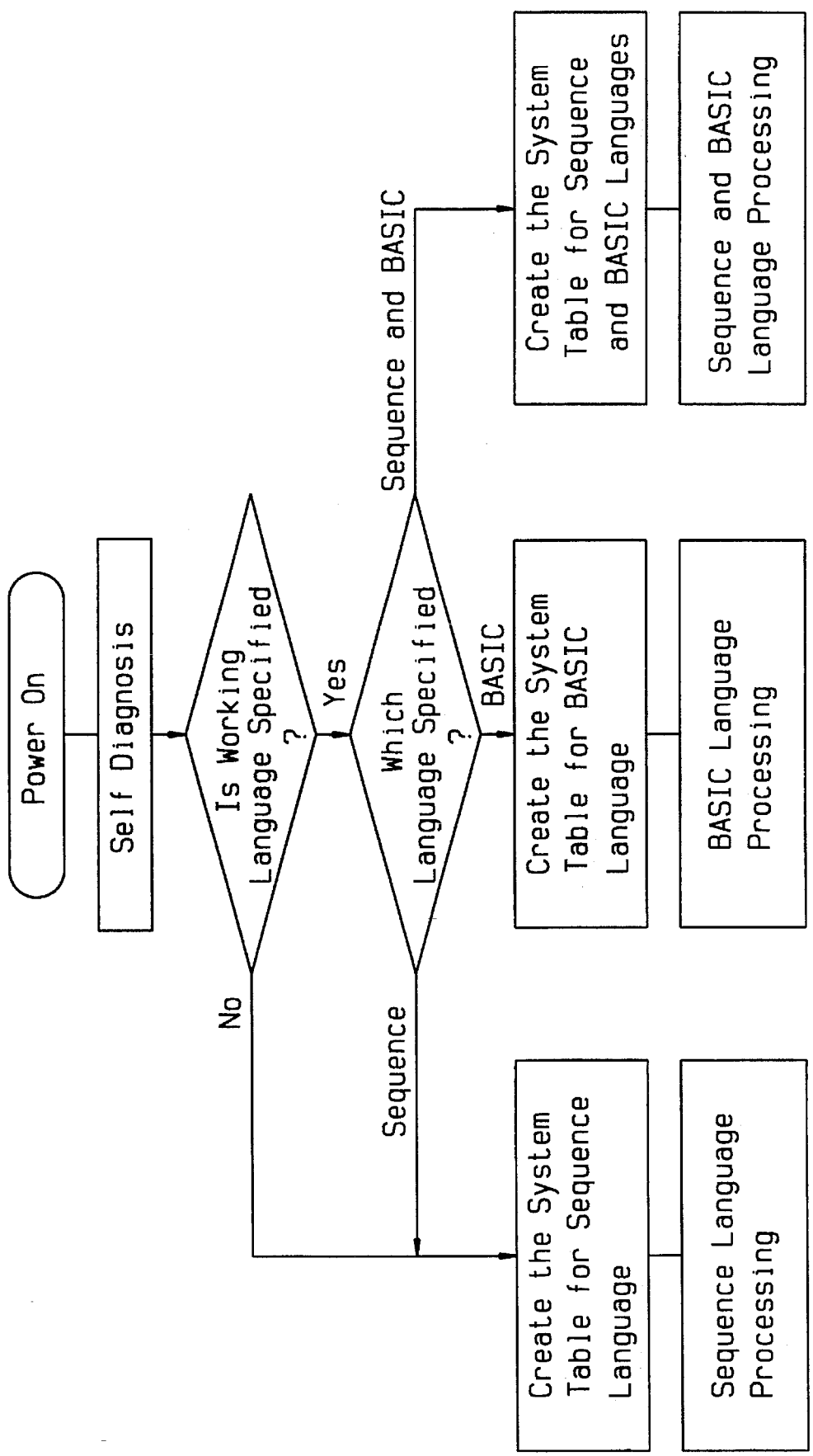
FIG. 16 is a flowchart that describes loading processing languages from a host computer for use by a programmable controller according to the present invention.

On the other hand, some system configurations do not need parallel execution of sequence control processing and BASIC processing. In some cases, either sequence control processing or BASIC processing is unnecessary, depending on modifications of the system. In that situation, CPU board 100 incorporates a program such as that shown in the flowchart of FIG. 16, and the system operates as follows.

After the power is turned ON and a self-diagnostic operation is executed, it is determined whether a working language is designated by the host computer. If not, as a default, the system proceeds as if the sequence language were specified: a system language table necessary for processing the sequence language is created in data memory 7 and sequence language processing begins. If a language is designated by the host computer, the program depicted in FIG. 16 checks to determine which language is specified. If the available language is a sequence language, the program proceeds as in the default situation described above. If the BASIC language is designated, a system table required for processing the BASIC language is created in data memory 7 and BASIC language processing begins. If both the sequence language and the BASIC language are designated, system tables necessary for processing both the sequence language and the BASIC language are created in data memory 7 and processing of both proceeds.

In this manner, the program creates the system tables corresponding to the languages designated, thereby facilitating the designation of the processing languages from the host computer, e.g., a desktop computer.

Figure 17:
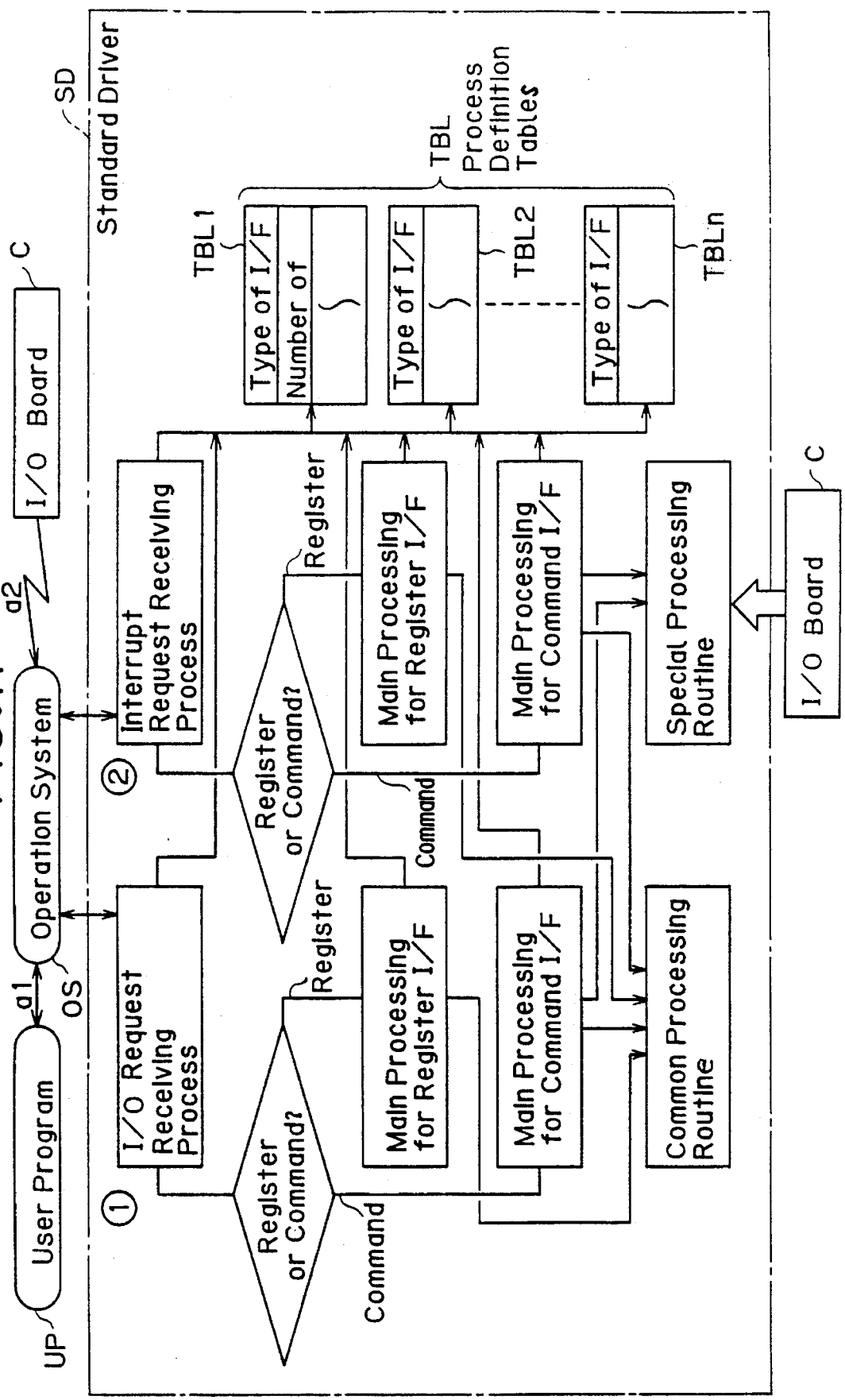
FIG. 17 is a conceptual diagram showing operations of a standard I/O driver of a programmable controller according to the present invention.

Next, a system as depicted in FIG. 17 will be described that uses a standard I/O driver set in CPU board 100 and thus is capable of utilizing various types of I/O boards.

An operating system OS in CPU board 100 receives an access request a1 for an I/O board C from a user program UP (such as a BASIC language program stored in CPU board 100) or an interrupt request a2 from I/O board C. Access request a1 from user program UP prompts an I/O request receiving process (1) to start, while interrupt request a2 prompts an interrupt request receiving process (2) to start.

When starting up the system, a standard I/O driver SD according to the present invention generates process definition tables TBL1, TBL2, . . . , TBLn for the individual I/O boards fitted to respective inter-unit slots. (Collectively, the tables are designated TBL; an arbitrary one of process definition tables TBL will be referred to as TBLi, i=1 to n.) When an I/O request receiving process (1) or an interrupt request receiving process (2) is begun, preparation for accessing the process definition tables TBL starts.

Upon initiating either process (1) or (2), a determination is made as to whether the I/O board to be accessed is classified as a register/interface type or a command/interface type, and then a corresponding main processing is executed. An example of a register/interface type I/O board is the ordinary I/O board C1 depicted in FIG. 11. The command/interface type I/O board is typified by I/O board C2 which, as illustrated in FIG. 11, incorporates a microprocessor to transfer and receive commands.

Common or standard operations for I/O request receiving process (1) and interrupt request receiving process (2) are performed as a common processing routine and are executed regardless of the type of interface of the I/O board. In addition, a special processing routine is executed for I/O boards requiring a different processing from the standard processing. At start-up, the special processing routine is uploaded to standard I/O driver SD from the I/O board that requires special processing. Also at start-up, an address of such a special processing routine is stored in the process definition table TBLi corresponding to that I/O board.

Figure 18:
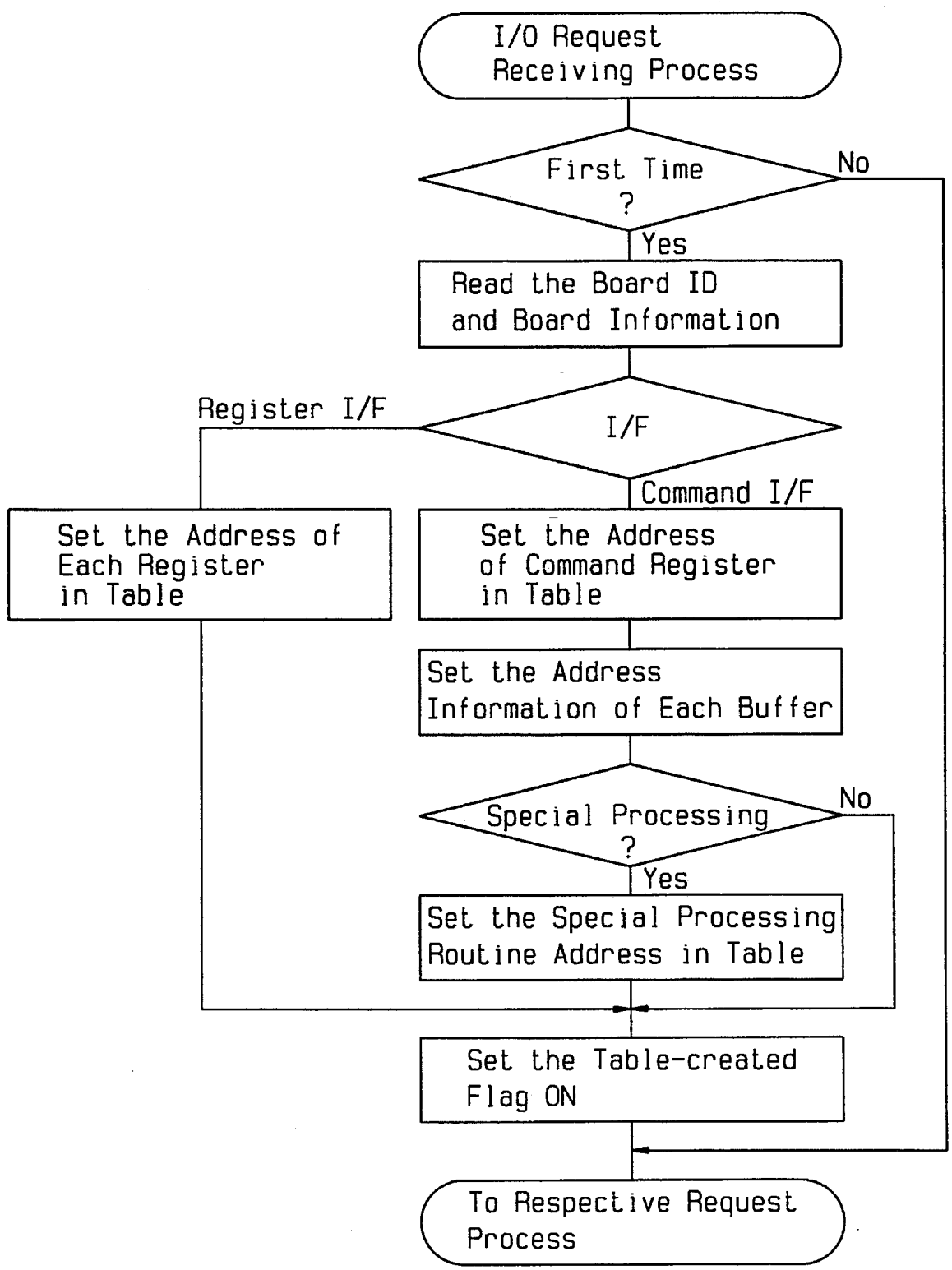
FIG. 18 is a flowchart showing a method of creating a process definition table in the standard I/O driver of a programmable controller according to the present invention.

A method of generating the process definition tables TBL will next be explained with reference to FIG. 18.

When performing the first I/O request receiving process of CPU board 100, the process definition tables TBL are generated for the respective I/O boards by reading a board ID and various other kinds of information from each of the I/O boards. Examples of I/O board information are the number of channels (the number of ports) and whether output is present. This information is stored in each process definition table TBLi as parameters of each I/O board.

If the I/O board concerned is classified as a command/interface type, addresses of the respective command registers are stored in the corresponding table TBLi, and subsequently addresses of respective buffers are stored in table TBLi. If special processing is needed, a special processing routine address is stored in that table.

If the I/O board is classified as a register/interface type, respective register addresses are stored in the corresponding table TBLi.

Finally, a flag which is created in each table is turned ON to execute a variety of request processes.

The above-mentioned operations are performed for the respective I/O boards provided in the system, thereby setting the process definition tables TBL in standard I/O driver SD.

Figure 19:
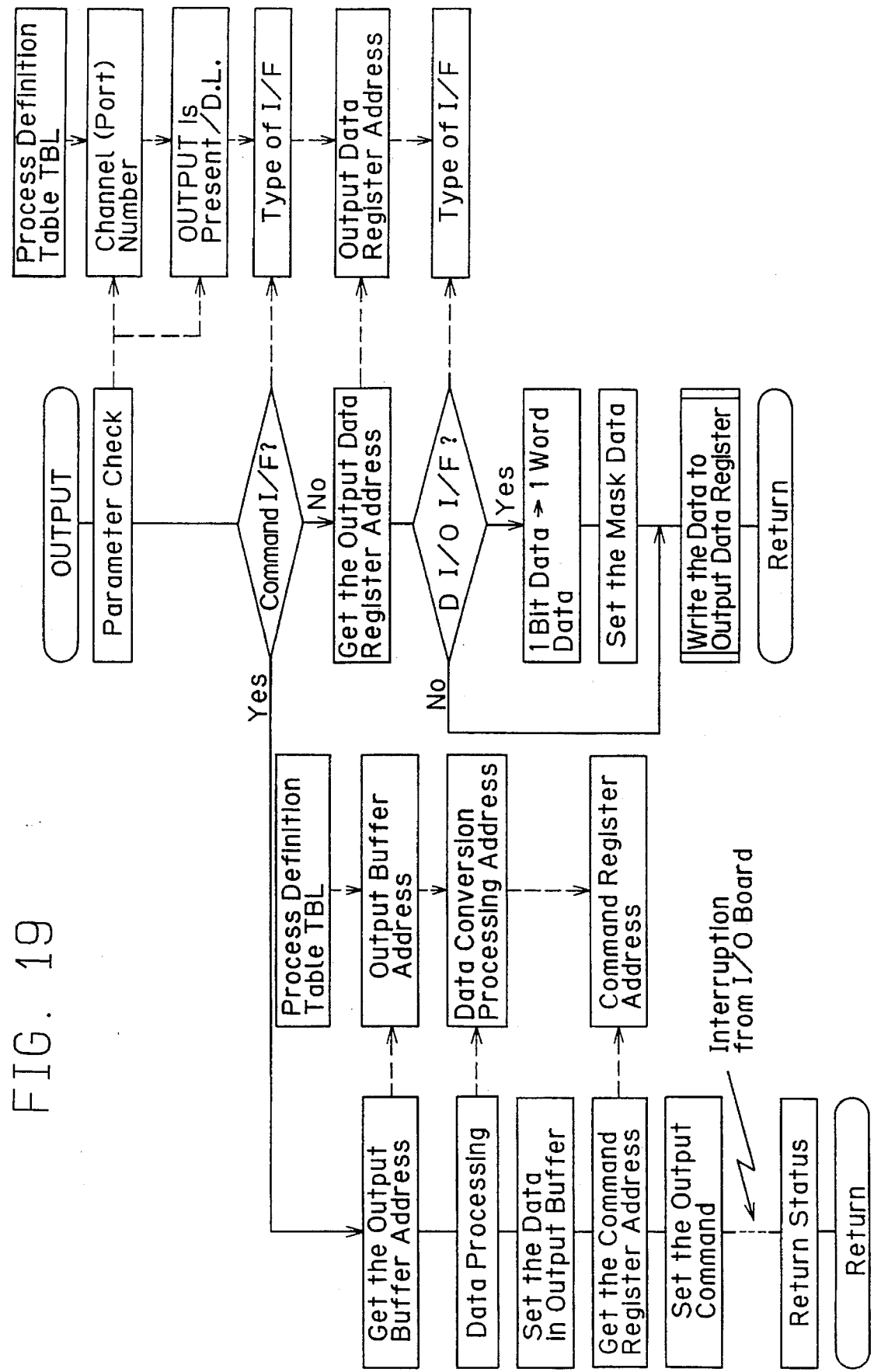
FIG. 19 is a flowchart showing I/O board access procedures by the standard I/O driver of a programmable controller according to the present invention.

Described below in conjunction with the flowchart of FIG. 19 is an example of accessing the standard I/O driver SD having process definition tables TBL.

Upon initiating an access, i.e., a data transfer preparing process, standard I/O driver SD of CPU board 100 refers to the process definition table TBLi of the I/O board concerned, checks the number of channels (the number of ports) of the I/O board concerned, checks for the presence or absence of output, and further identifies the type of interface.

If classified as a command/interface type, a data conversion is effected by getting an output buffer address while referring further to the process definition table TBLi. The data to be output are stored in the output buffer. Referring again to the process definition table TBLi, an output command for outputting the data stored in the output buffer is set by getting a command register address, in which state there is a wait for an interrupt from the I/O board. Immediately upon receiving the interrupt, a return status is output.

If the I/O board concerned is of a register/interface type, whether it is a data I/O interface (D I/O I/F) is checked by getting the output data register address while referring to the process definition table TBLi. In the case of a data I/O interface, 1-bit data is converted into 1-word data, and mask data are set. Then, the data are written to the output data register. The process of writing the data to the output data register is well known.

The above-described standard I/O driver SD is equipped by mounting multiple I/O boards in the system. Process definition tables are created for every I/O board, and accessing the I/O boards is carried out on the basis of the process definition tables. Thus there is no need for providing one driver per I/O board. By using only one standard I/O driver it is possible to access all the I/O boards without causing any decline in performance. A variety of I/O boards can be employed with the single standard I/O driver, thus no further design development of the I/O driver is necessary when adding another type of I/O board to the system. This also reduces the memory capacity necessary for storing the I/O driver. Furthermore, the interfaces of the I/O boards are standardized into the register type or the command type, thus simplifying an I/O board's design and its incorporation into the system.

A method of hardware-based data transfer to an I/O board connected via I/O bus bb to CPU board 100 will next be described with reference to FIGS. 20 and 21.

Referring to the block diagram of FIG. 11, I/O interface 8 (between I/O bus bb and CPU board 100) and interfaces (I/F) C11 and C21 (for I/O boards C1 and C2, respectively) are provided with strobing signal generating means for generating strobing signals STB* on the control line in I/O bus bb when a data transfer request arises. Specifically, though not explicitly shown in FIG. 11, logic elements for transferring strobing signals STB* to I/O bus bb per a transfer frame in association with a data transfer request are added to I/O interface 8, composed of a gate array and the interfaces C11 and C21.

Figure 20:
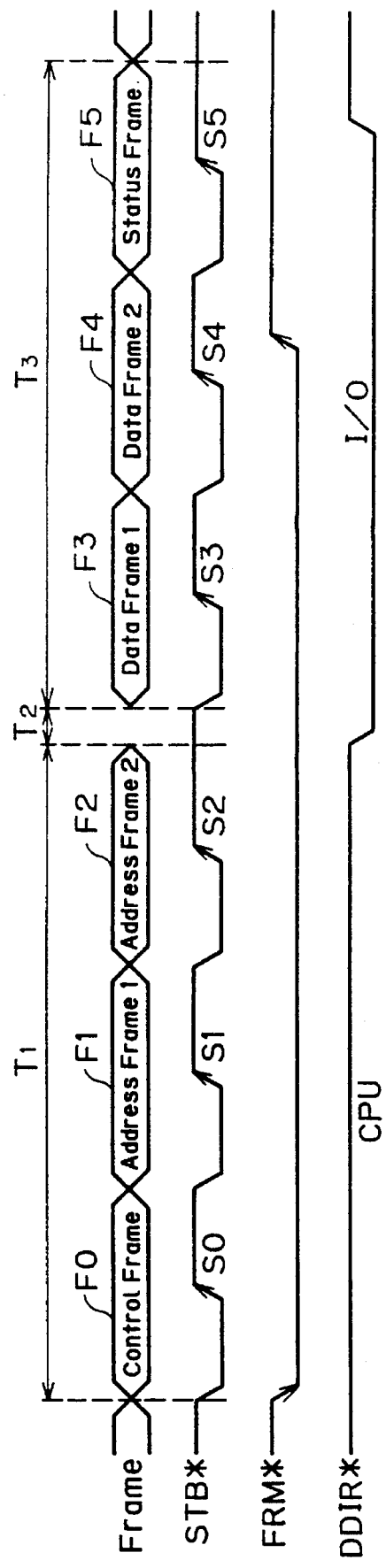
FIGS. 20 and 21 are timing diagrams each showing a data transfer between an I/O board and a CPU board of a programmable controller according to the present invention.

FIG. 20 is a timing diagram showing a case where the I/O board transfers the data to CPU board 100 in response to a data transfer request from CPU board 100.

When the data transfer request is generated from CPU board 100, CPU board 100 transmits a control frame F0 and strobing signals STB*"L" to the I/O bus bb. ("L" denotes a "low" signal.) Control frame F0 comprises transfer mode bits and byte enable bits. The transfer mode bits are used for identifying a read/write signal and for specifying data size (e.g., 2 or 4 bytes) and data type (data or control signal). The byte enable bits are used to select byte unit access or bit unit access. The control frame F0 becomes effective at a first transition edge S0 of the strobing signal STB*"L".

Subsequently, CPU board 100 transmits address frames F1 and F2, each composed of a 2-byte frame, for securing a 256 KB address space. These address frames F1 and F2 become effective at last transition edges S1 and S2 of the strobing signals STB*"L". The operations on the part of the CPU board 100 up to this point occur during a time period T1.

During a time period T2, the I/O board receiving the frames F0, F1, and F2 determines whether the board itself is selected. If selected, the I/O board executes a data transmission preparing process.

The selected I/O board sends out data frames F3 and F4 to be transmitted onto I/O bus bb during a time period T3. In this example, the data is 2 bytes. Simultaneously, the I/O board transmits strobing signals STB*"L". The data frames F3 and F4 become effective at last transition edges S3 and S4 of strobing signals STB*"L".

Finally, the I/O board transmits a status frame F5 together with the strobing signal STB*"L". The 1-byte status frame F5 is an internal condition signal of the I/O board concerned, i.e., a signal for indicating a variety of conditions such as a normal data transfer, an error status, and a board failure condition.

Note that a frame signal FRM, represents the first frame (F0) at its last transition edge and the last frame (F5) at its first transition edge, and is utilized for detecting a framing error. FRM* indicates whether frames F0 and F4 can be transmitted normally by going "low" at frame F0 and going "high" at frame F4. A data direction specifying signal DDIR* is utilized for preventing a data impingement between CPU board 100 and the I/O board. Data direction specifying signal DDIR* indicates a frame transfer from CPU board 100 to the I/O board when it is "high" ("H") during a data transfer cycle, and indicates a frame transfer from the I/O board to CPU board 100 when it is "low" ("L"). The signals FRM, and DDIR, are transmitted onto a control line of I/O bus bb.

Figure 21:
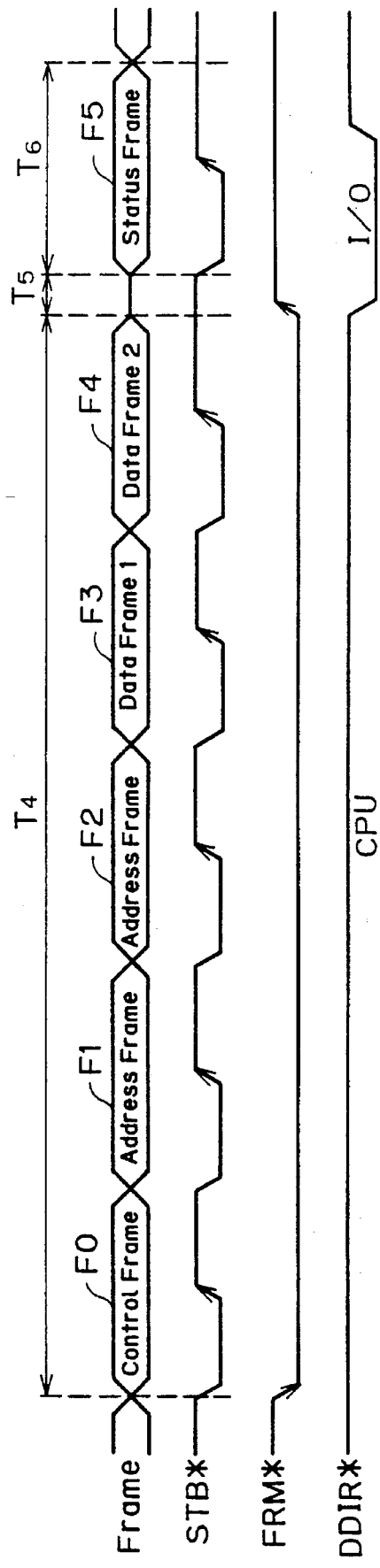

Turning to FIG. 21, a timing diagram is shown for effecting a data transfer from CPU board 100 to the I/O board.

In this case, during a time period T4, CPU board 100 outputs control frame F0, address frames F1 and F2, and data frames F3 and F4 together with strobing signals STB*"L". After the I/O board has carried out the processes required during a time period T5, the I/O board sends back status frame F5 and strobing signal STB*"L" during a time period T6.

The data transfer procedures described above in conjunction with FIGS. 20 and 21 implement a mixture of synchronous and asynchronous transfer methods. CPU board 100 or an I/O board transmits strobing signals STB*"L" each time a frame is transferred, thereby making the concerned frame effective. Thus, the frames are transferred by a synchronous method. However, in the case of FIG. 20, the transfer process for time periods T1 and T3 is based on an asynchronous method with respect to the data transfer cycle as a whole.

Specifically, during time period T1 when the data transfer request is generated, CPU board 100 transmits frames F0 to F2 to the I/O board in accordance with strobing signals at S0 to S2 synchronized with frames F0 to F2, and therefore synchronous transmission between frames F0 to F2 and the strobing signals at S0 to S2 is carried out.

In response to that request, after data transmission preparation during time period T2, the I/O board sends back to the CPU board frames F3 to F5 during time period T3 in accordance with strobing signals at S3 to S5 synchronized with frames F3 to F5. Therefore, synchronous transmission between frames F3 to F5 and the strobing signals at S3 to S5 is carried out.

However, the strobing signals at S0 to S2 and S3 to S5 are produced independently in the CPU board and the I/O board. Thus, there is an asynchronous relationship between frames F0 to F2 and F3 to F5. In the case of FIG. 21, the transfer process for time periods T4 and T6 is similarly based on an asynchronous method.

Figure 22:
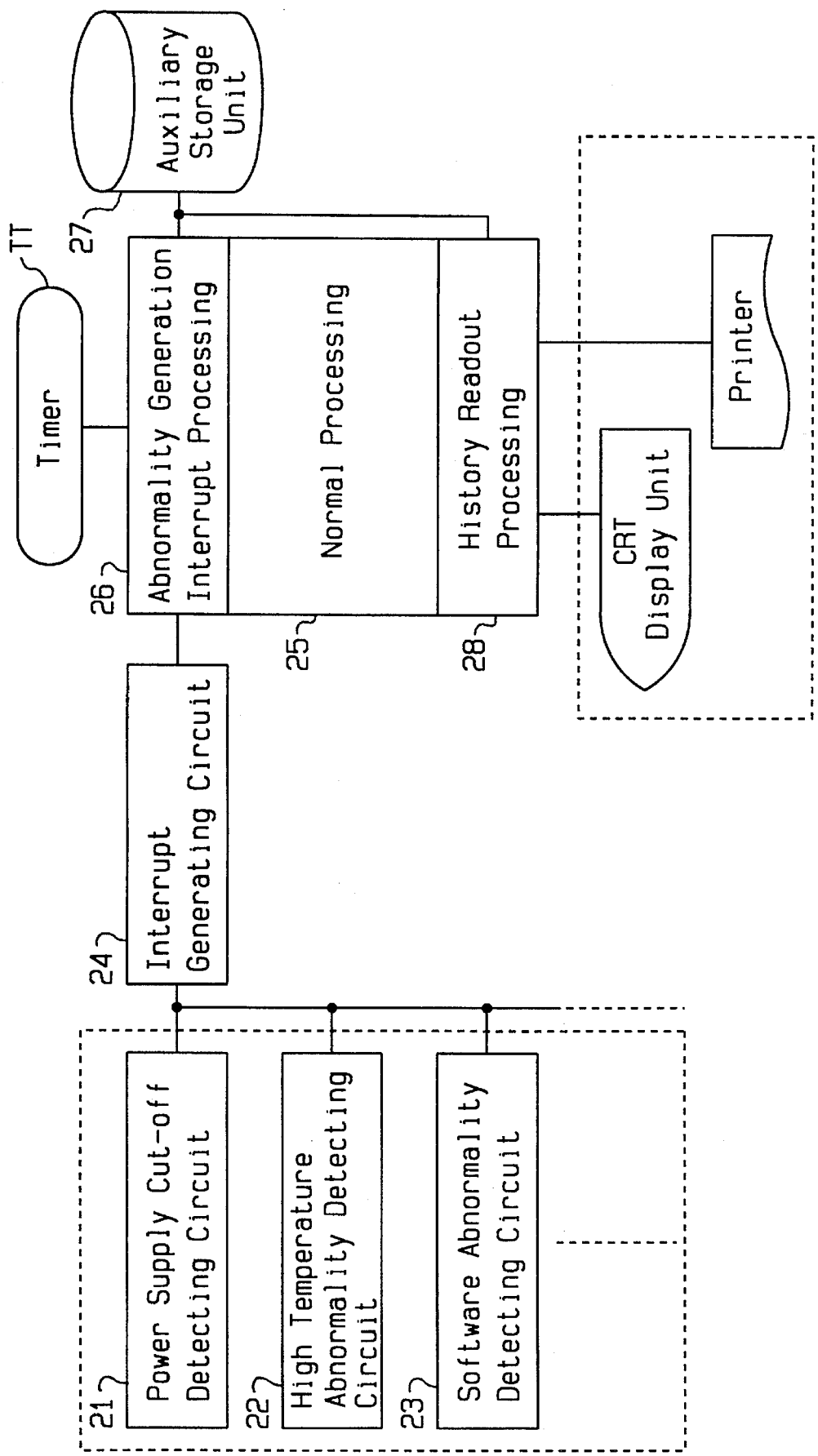
FIG. 22 is a block diagram illustrating an abnormality recording module incorporated in a programmable controller according to the present invention.

FIG. 22 shows a module used to record a failure history of a programmable controller. The programmable controller includes abnormality detecting circuits such as a power supply cut-off detecting circuit 21 for detecting that the power supply is cut off; a high temperature abnormality detecting circuit 22 for an abnormality in internal temperature; and a software abnormality detecting circuit 23 for detecting a hangup of the internally executed software. If an abnormality detecting signal is generated from any one of these abnormality circuits, the detecting signal is input to an interrupt generating circuit 24, thereby sending an interrupt to CPU 1 (not shown).

When CPU 1 receives the interrupt signal it initiates abnormality generation interrupt processing 26 as part of normal processing 25.

In addition, CPU 1 has a timer TT that functions to relate the type of abnormality caused to the time at which the abnormality occurs and to start the abnormality generation interrupt processing 26. CPU 1 then arranges the abnormalities that occur in chronological order, while an auxiliary storage unit 27 stores these abnormalities in a file format. Auxiliary storage unit 27 involves the use of data memory 7.

If requested to by the host computer, CPU 1 starts history readout processing 28 and reads the contents of auxiliary storage unit 27 for transmission to the host computer. This arrangement makes it possible to output abnormality conditions to a user in a table format such as that shown in FIG. 23 by use of a host computer CRT display unit and a printer. It is also possible to analyze readily details of the abnormalities that occur and the time of occurrence of the errors, and to take measures to correct or prevent the errors.

A manner of specifying a ladder circuit in which errors are displayed to a user during execution of either the ladder program or a desired ladder circuit in the programmable controller of the invention will be explained below.

Figure 24:
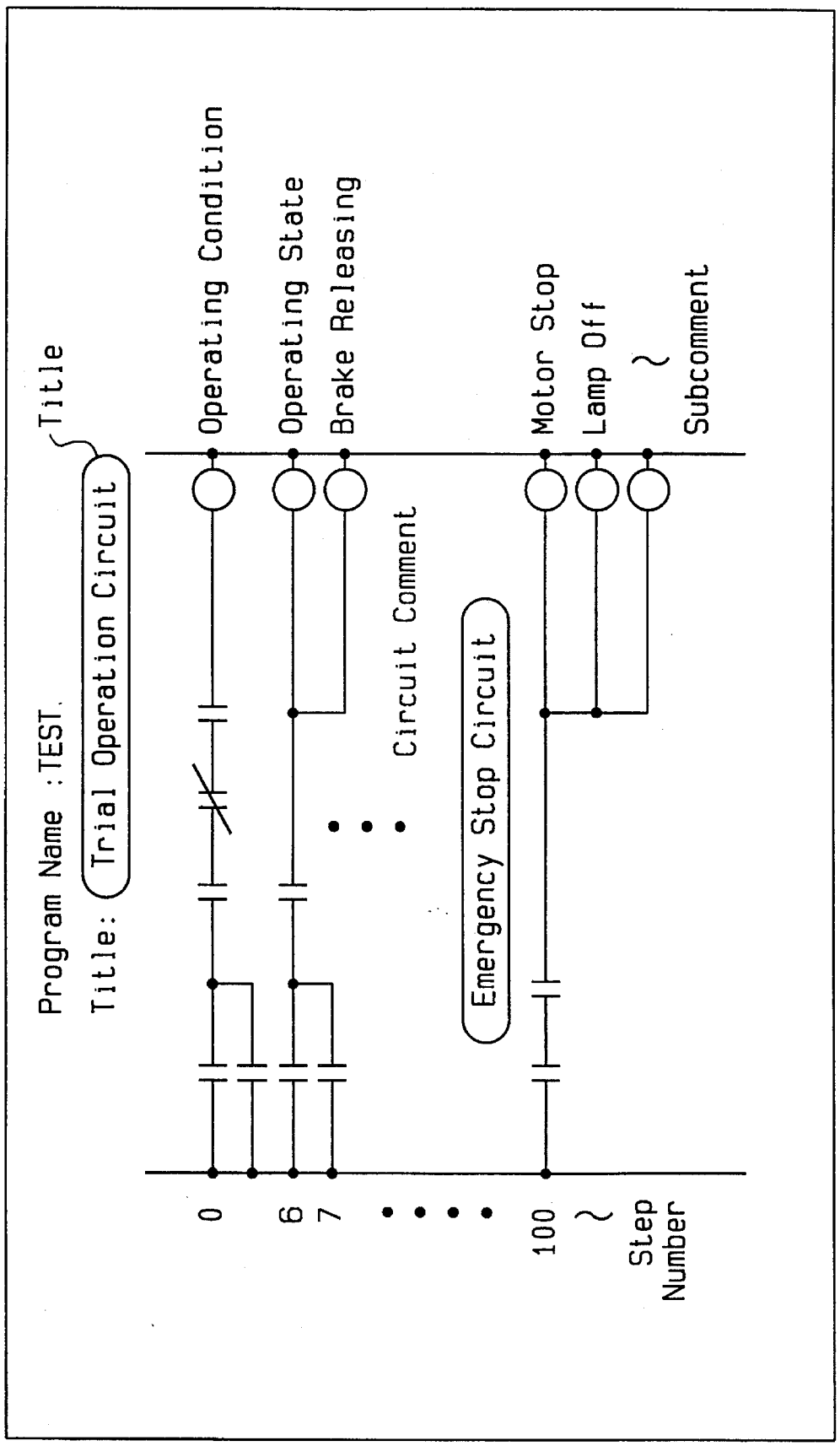
FIG. 24 is a diagram depicting a ladder circuit to which a variety of comments generated by a programming tool are added.

The programmable controller is connected via, e.g., an RS232C or RS422 interface to a program creating tool. Typically, as illustrated in FIG. 24, the ladder program is in a format in which a variety of comments are added to the respective ladder circuits. For example, in the ladder program shown, there are a program name "TEST" a title "Trial Operation Circuit", step numbers of the ladder circuits, a circuit comment "Emergency Stop Circuit" for a plurality of ladder circuits, and subcomments "Operating Condition", "Operating State", etc., corresponding to every line of the ladder circuit.

The programmable controller internally stores the above-described ladder program to execute the control process. However, if an abnormality takes place during the sequence control process, the programming creation tool reads all the program steps and displays them on the CRT display in order to specify the location of a failure.

A ladder circuit may have thousands of steps, and it is therefore difficult to display the specified ladder circuit on the CRT, which has a limited display capability. Usually, all the ladder circuits are printed out, and the program list is brought to the local appliances for the purpose of comparing the actual circuits to the corresponding circuits in the program. However, this ladder circuit specifying method is not very workable.

In a programmable controller according to the present invention, the ladder circuits are specified by the following method.

Figure 25:
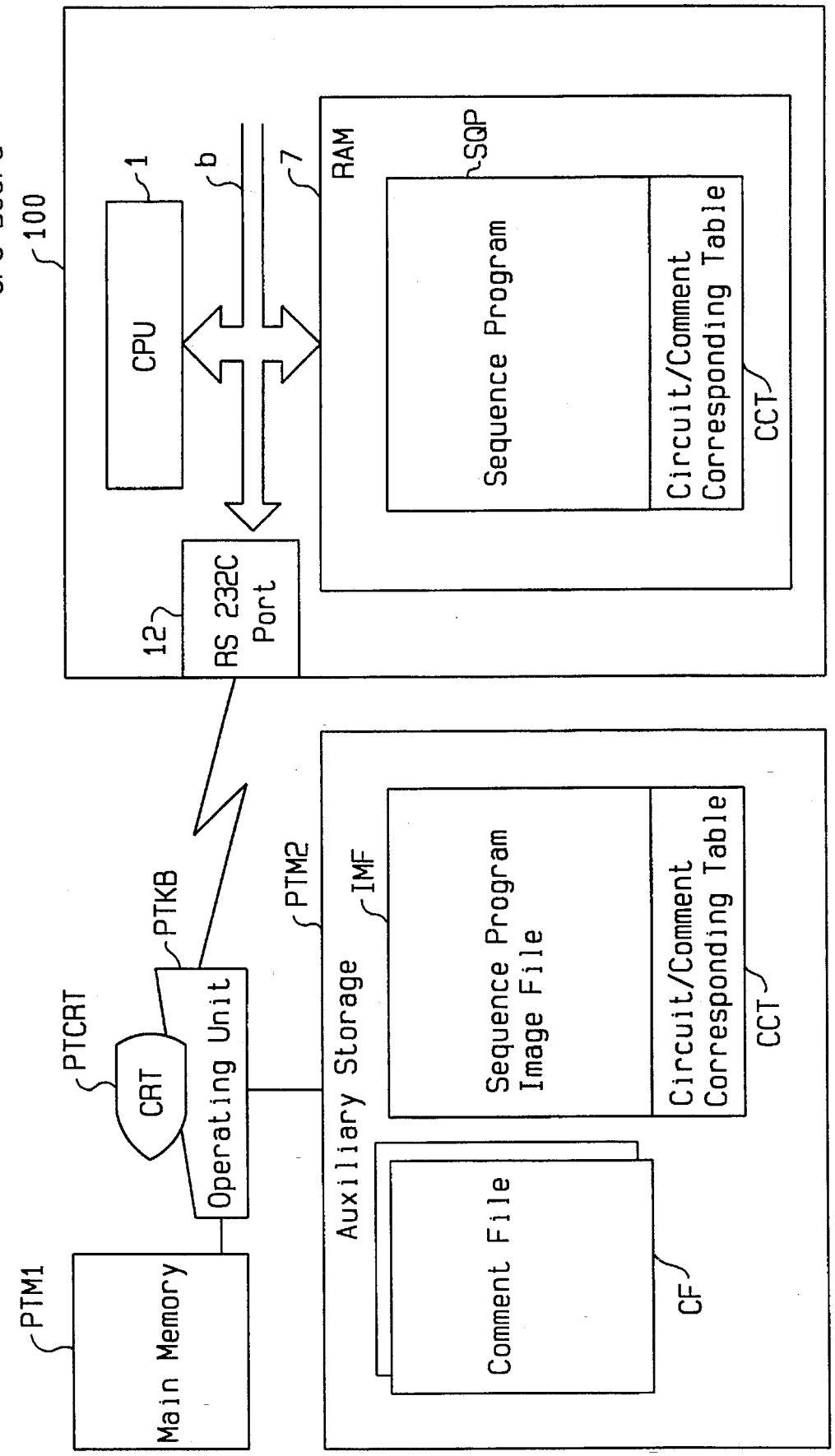
FIG. 25 is a block diagram representing a programming tool according to the present invention and a function to display the comments corresponding to step numbers.

FIG. 25 is a block diagram depicting an arrangement in which a programming tool is connected to CPU board 100 of the programmable controller. To simplify the explanation, only CPU 1, RS232C port 12, RAM 7, and information bus b are illustrated in CPU board 100. The programming tool connected to RS232C port 12 of CPU board 100 includes a display unit PTCRT, a keyboard PTKB, a main memory PTM1 and an auxiliary memory PTM2.

The ladder circuits are edited on the programming tool in accordance with the sequence control and the edited results are temporarily stored in a sequence program image file IMF. A created ladder program is transferred back via RS232C port 12 and bus b to RAM 7. At this time, a circuit/comment corresponding table CCT in which the ladder circuits correspond to various kinds of comments is also transferred back together with the ladder program. Circuit/comment corresponding table CCT is intended to make comment positions (step numbers) on the circuits correspond to comment positions in a comment file CF, which will be described later. With this circuit/comment corresponding table CCT, it is possible to store the positions of the ladder circuits and the corresponding comments even if the program is modified.

With this arrangement, CPU 1 stores the transferred sequence program SQP and circuit/comment corresponding table CCT.

Stored in auxiliary storage unit PTM2 in the programming tool is a comment file CF, which stores step numbers of the ladder circuits and the corresponding comments added to the ladder circuits.

FIG. 26 shows an example of the contents of comment file CF. FIG. 27 represents an example of the contents of circuit/comment corresponding table CCT. Comment file CF may also be stored in RAM 7 in CPU board 100 rather than in the programming tool. Additionally, a comment file which corresponds the step numbers to the subcomments may be added.

Figure 28:
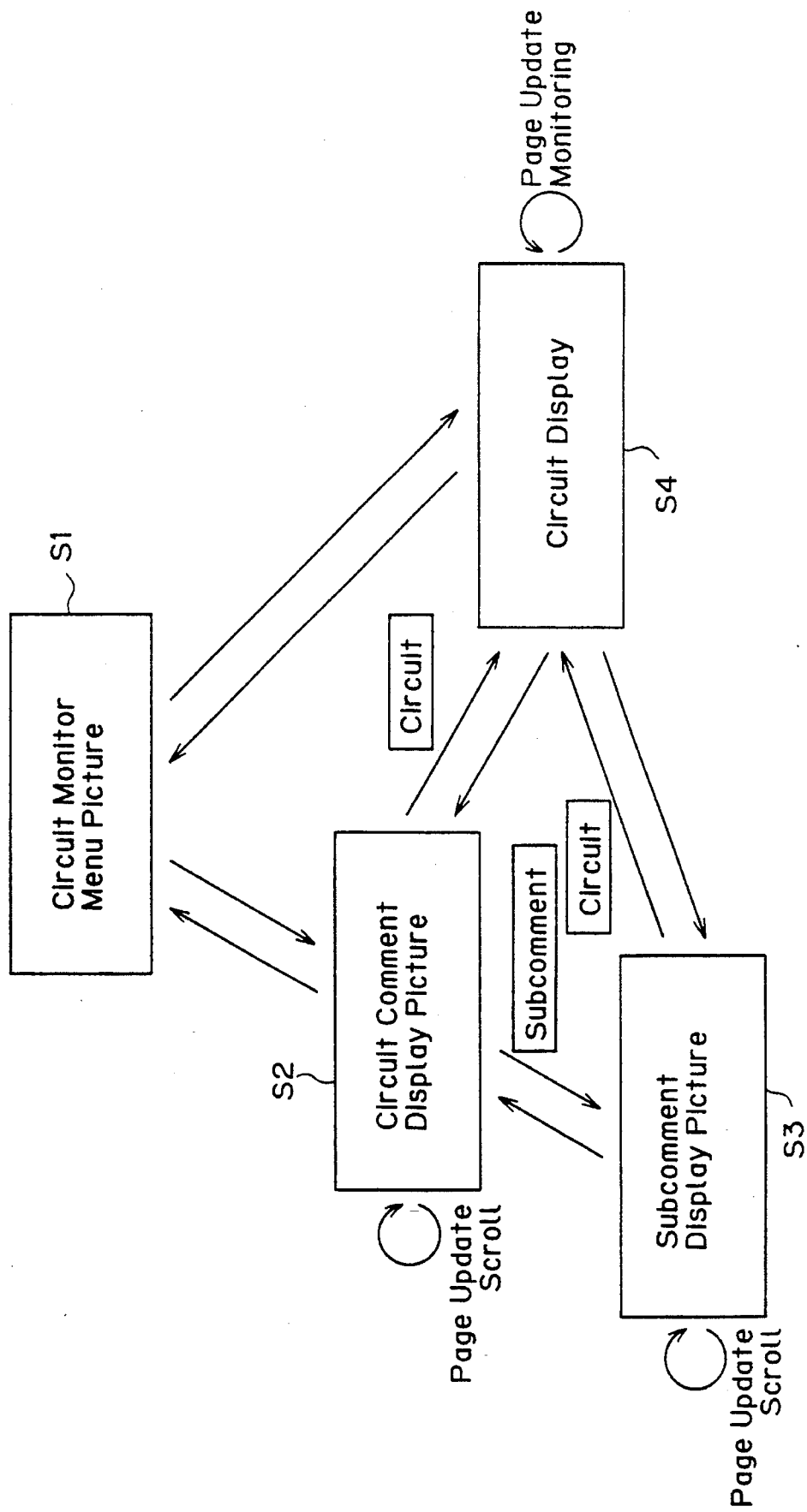
FIG. 28 is a diagram showing transitions of CRT displays in the programming tool based on the function of FIG. 25.

The operation of seeking out specific locations of the ladder circuits on the programming tool will be described with reference to FIG. 28. The programming tool reads the contents of comment file CF and circuit/comment corresponding table CCT, which is preset to indicate subsequent display pictures S1, S2, S3, and S4 on the CRT display unit.

An initial picture displayed on the CRT display unit of the programming tool is a circuit monitor menu picture S1, from which picture a circuit comment display picture S2 is selected. Then, a circuit comment list is displayed in a list format on the CRT. From the circuit comment display picture S2, a subcomment display picture S3 is further selected, and thereafter all the subcomments included in the circuit comment are displayed. When a circuit display picture S4 is selected corresponding to the subcomment, the ladder circuit corresponding to this subcomment is displayed.

In particular, in order to specify a certain ladder circuit from the ladder program shown in FIG. 24, a desired circuit comment is selected by displaying a list of the circuit comments, and a specific ladder circuit can be displayed on the CRT display by designating a ladder circuit corresponding to the subcomment included in this circuit comment.

Note that the circuit picture S4 may be selected from the circuit monitor menu picture S1 or the circuit comment list S2. Page update scrolling and page update monitoring can be effected on the respective display pictures.

As stated above, in a programmable controller according to the invention, the comment file and the circuit/comment corresponding table are set and then read out. A correspondence between the ladder circuits and a variety of comments added to the ladder circuits is established to enable a hierarchical display on a CRT. Thus, it is possible to immediately detect a desired ladder circuit.

The arrangement described above provides easy-to-search ladder circuits, useful for adjusting the circuits or locating an error. The description will next focus on improvements in creating the ladder program and on operation during debugging.

Figure 29:
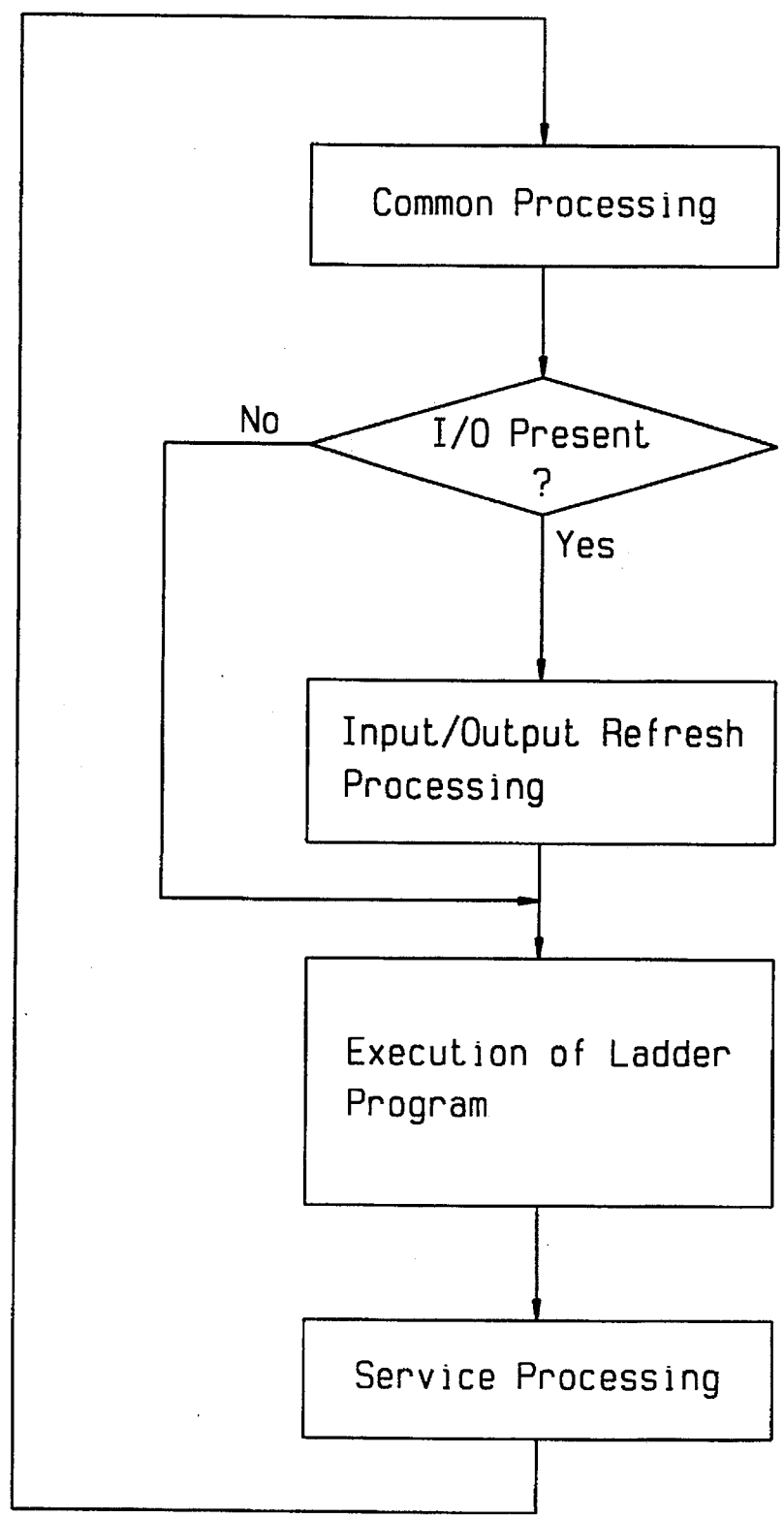
FIG. 29 is a flowchart showing a processing routine of a programmable controller according to the present invention.

FIG. 29 shows a flowchart of a processing routine of a programmable controller according to the present invention. A sequence control process which uses a ladder program is executed by a processing routine consisting of common processing such as a self-diagnosis, I/O refresh processing of I/O registers in an I/O board, execution of the stored ladder program, and service processing for a host appliance.

In a programmable controller according to the invention, the I/O refresh process subsequent to the common process is, as illustrated in FIG. 29, omitted in order to perform programming and debugging when creating the sequence control program without mounting the I/O board. With this arrangement, the debugging operation can be done, without the I/O board, in conformity with an instruction from a debugger such as a programming tool or the like.

Figure 30:
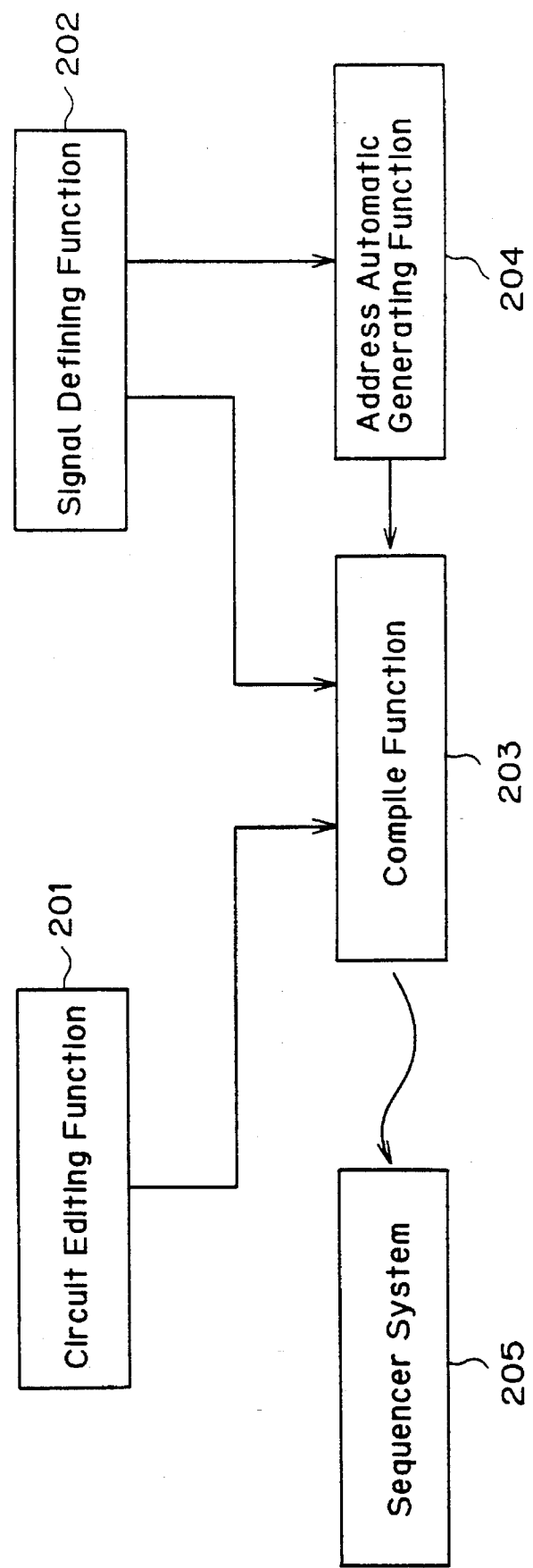
FIG. 30 is a block diagram showing functional blocks at during ladder circuit programming in a programmable controller according to the present invention.

FIG. 30 is a diagram showing a programming function of the ladder program in a programmable controller according to the present invention. Respective blocks in the Figure represent software-functional blocks of the programmable controller.

The individual functional blocks in FIG. 30 work as follows. A circuit editing function 201 is for editing respective circuit components of the ladder circuit, with which a programmer describes addresses of the respective circuit components by using signal names similar to device names used when designing the ladder circuit. A signal defining function 202 serves as a unit for storing in a table format a correspondence of the addresses to the signal names of the respective circuit components. A compile function 203 transmits to a sequencer system 205 a program in an executable format with reference to the signal names in the ladder circuit. The corresponding addresses are supplied from signal defining function 202 and from an address automatic generating function 204. Address automatic generating function 204 automatically assigns detailed addresses to the signal names supplied from signal defining function 202.

Procedures for creating the ladder program by utilizing these functions are described below.

Figures 31, 32, 33:
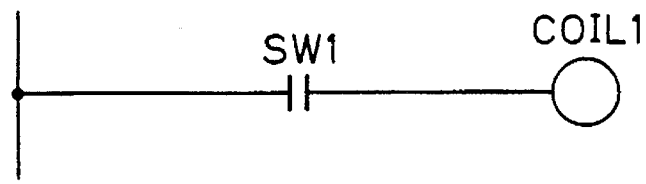
FIG. 31 is a diagram showing a ladder circuit.
FIG. 32 is a diagram showing correspondence of signal names of a ladder circuit to addresses.
FIG. 33 is a diagram showing allocations of detailed addresses to the signal names of the ladder circuit of FIG. 32.

A ladder circuit such as that depicted in FIG. 31 is generated in cooperation with the programming tool and circuit editing function 201. The individual circuit components of a relay unit, an output unit, and so on are set in the form of signal names such as SW1 and COIL1. As shown in FIG. 32, signal defining function 202 arranges signal names SW1, SW2, COIL1, COIL2, IRL1, TIM1, CNT1 and REG1 to correspond to addresses X, X, Y, Y, I, T, C and D, where the symbol X is an address representing an input, Y is an output address, I is an internal relay address, T is a timer address, C is a counter address, and D is a data register address.

The detailed addresses are automatically assigned in address automatic generating function 204. For example, for the address X, set to circuit element SW1, a detailed address X001 is assigned. The detailed addresses are set sequentially to correspond to the number of the signal names of the ladder circuit components. In this example, the address X001 is set to the signal name SW1, and the address X002 is set to the signal name SW2. The results for all the components of FIG. 32 are shown in FIG. 33.

While processing is performed in sequencer system 205 in accordance with the program in executable format produced by compile function 203, debugging can be carried out solely by CPU board 100 without mounting the I/O board, because the I/O refresh process is, as illustrated in the flowchart of FIG. 29, bypassed if the I/O board is not mounted at the debugging stage. Based on the results of debugging, detailed addresses are added as needed.

Thus, the signal names can automatically correspond to the detailed addresses without a programmer being aware of the addresses of the respective ladder circuit components, which in turn facilitates a design of the sequence control program. Debugging can be accomplished without an I/O board, and the ladder program operations can be debugged before finishing the design of a relay board which corresponds to the sequence process.

Figure 34A:
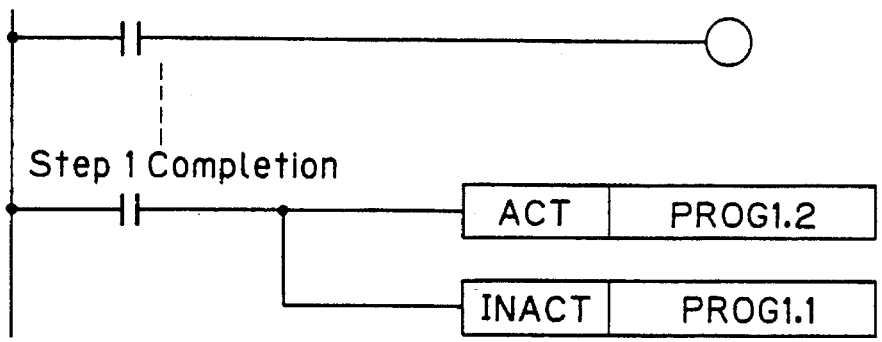
FIGS. 34(a) through 34(c) are diagrams each showing a ladder program created block by block.
Figure 34B:
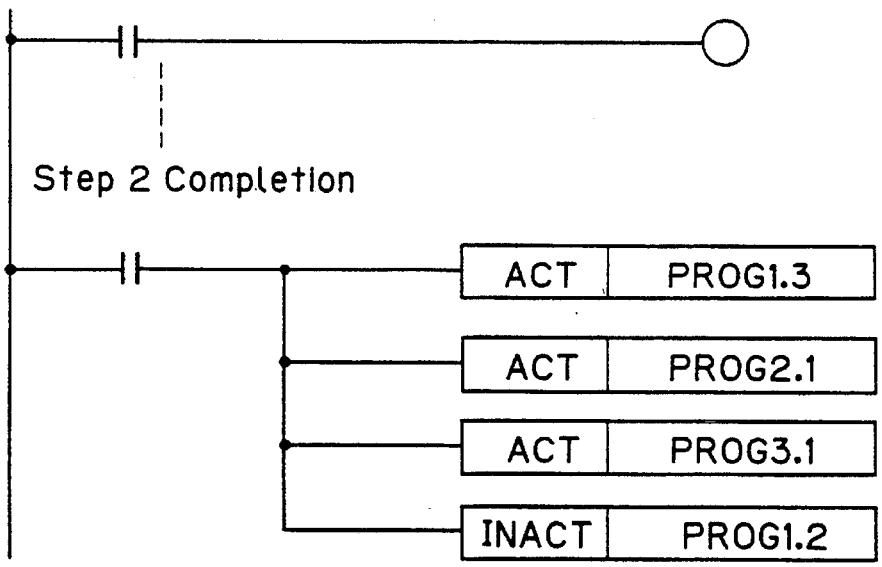
Figure 34C:
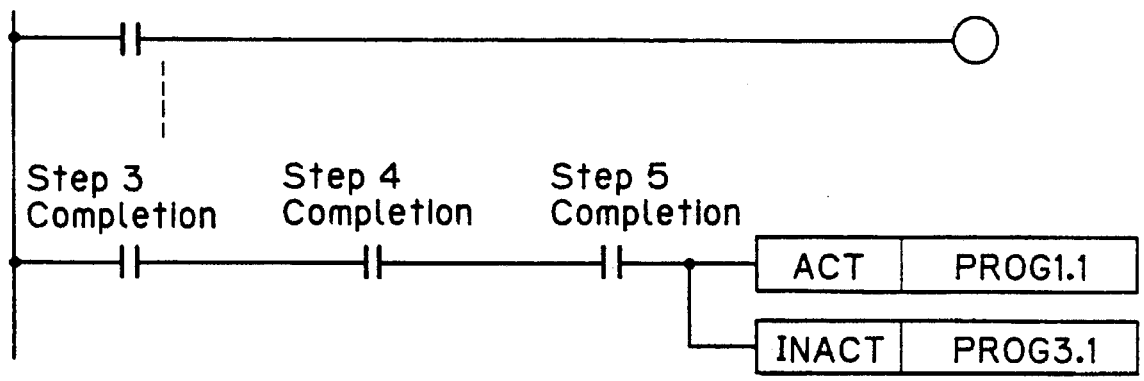

A programmable controller according to the present invention typically performs programming with a ladder program having thousands of steps by splitting the number of blocks per step. FIGS. 34(a) through 34(c) show programming modes.

FIGS. 34(a), 34(b), and 34(c) represent steps 1, 2, and 3 to 5 of a part of a ladder program.

A start command "ACT PROG1.2" and an end command "INACT PROG1.1" are set at the final substep of step 1. With this arrangement, when a control operation of step 1 reaches the final substep, a block ladder program PROG1.2 of step 2 is started by stopping a block ladder program PROG1.1 of step 1, thereby initiating the control operation of step 2.

Set at the final substep of the block ladder program PROG1.2 are a stop command "INACT PROG1.2", for stopping the block ladder program PROG1.2, and parallel start commands "ACT PROG1.2", "ACT PROG2.1", and "ACT PROG3.1", for simultaneously starting steps 3 to 5.

The ends of steps 3 and 4 are monitored in step 5. When detecting the cessation of steps 3, 4, and 5, the operation returns to step 1, i.e., the starting step of the sequence control process, in response to stop command "INACT PROG3.1" and start command "ACT PROG1.1".

The start commands "ACT" and the stop commands "INACT" of the ladder program as thus defined make it possible to effect programming in parallel by splitting a series of thousands of sequence control programs into several blocks. In addition, the ladder programs inform each other of starting and ending, whereby the sequence control operation can be carried out by storing the ladder programs split into blocks in a plurality of CPU boards.

Figures 35, 36:
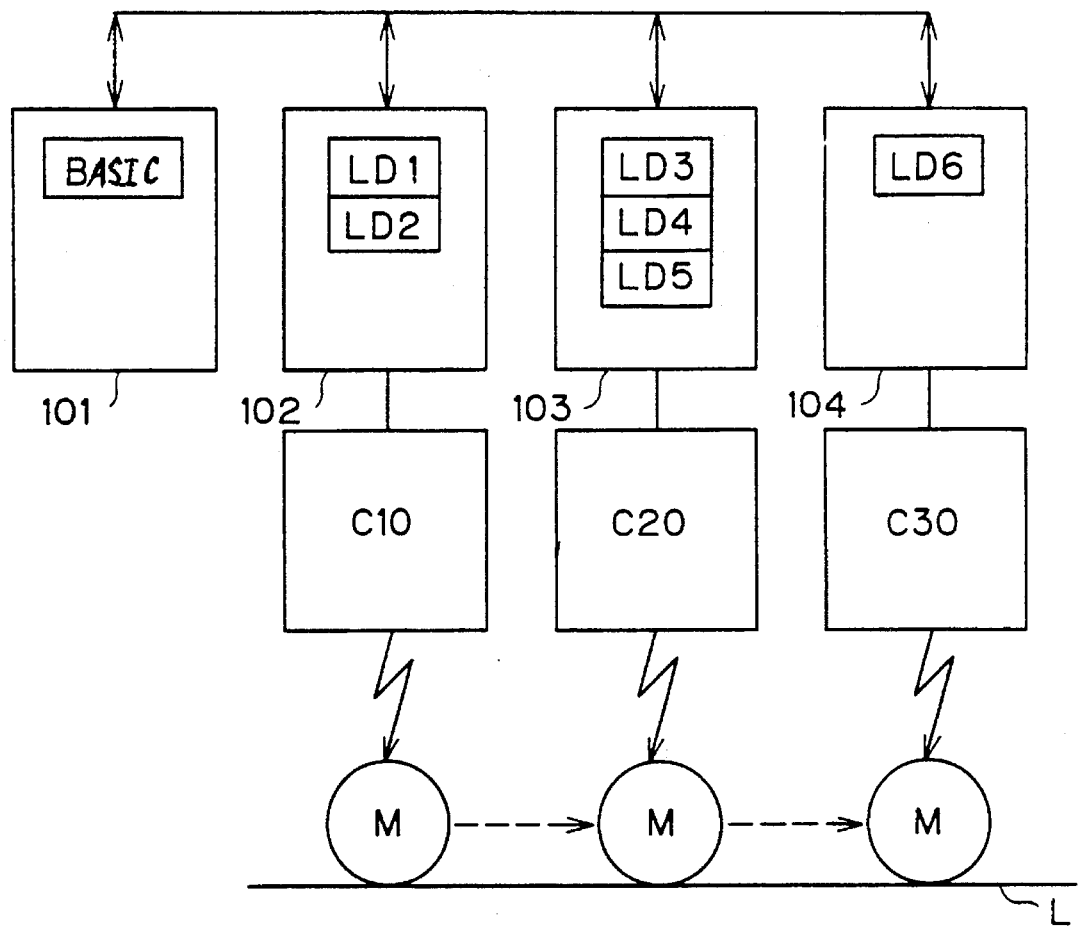
FIG. 35 is a diagram representing a case where a series of sequence control programs are executed by several programmable controllers.
FIG. 36 is a program listing showing one example of a BASIC program for controlling the system of FIG. 35.

Turning to FIG. 35, an example is shown where a control object M (a product on a production line) on a control line L is controlled by combining a CPU board 101 in which a BASIC program is stored, and CPU boards 102 to 104 in which only ladder programs are stored.

Ladder programs LD1 and LD2 are stored in CPU board 102, to which an I/O board group C10 is connected; ladder programs LD3 through LD5 are stored in CPU board 103, to which an I/O board group C20 is connected; and a ladder program LD6 is stored in the CPU board 104, to which an I/O board group C30 is connected.

FIG. 36 illustrates an example of the BASIC program stored in CPU board 101.

Ladder programs LD1 through LD6 are defined as a series of sequence control programs with respect to control object M, these ladder programs having the block construction described above and being programmed independently.

According to the example shown in FIG. 36, when starting operation, the BASIC program stored in CPU board 101 sequentially actuates ladder programs LD1 and LD2 of CPU board 102. After these programs have ended, ladder program LD3 or LD4 of the CPU board 103 is executed in accordance with the sequence processing results at that time, indicated by COND1. Immediately after finishing the program LD3 or LD4, the BASIC program functions to start in parallel both ladder program LD5 incorporated into CPU board 103 and ladder program LD5 incorporated into CPU board 104.

In accordance with the illustrated system, sequence control programs in which a series of sequence control operations are divided into blocks are handled and processed by a plurality of programmable controllers. Thus, highly efficient sequence control processing can be done.

As discussed above, a programmable controller according to the invention is capable of improving the velocity of sequence control processing and attaining an easy-to-redesign system when modification is desired. A programmable controller exhibiting a high processing efficiency can thus be realized.

Although the illustrative embodiments of the present invention have been described in detail with reference to the accompanying drawings, it should be understood that the present invention is not limited to those precise embodiments. Various changes or modifications may be made by one skilled in the art without departing from the scope or spirit of the invention, and are limited only by the scope of the claims.

What is claimed is:

1. A programmable controller comprising:

one or more I/O boards for transferring and receiving multiple information to and from a control object; and a processor board for imparting a control signal to the control object via the I/O boards, the processor board comprising:

first processor means for controlling the processor board, for executing commands of a sequence control program type, and for executing commands of a BASIC program type for performing general-purpose arithmetic processing, information processing, or a control operation, by starting executing the commands of sequence control program type and making an end instruction;

program memory means for storing the commands of sequence control program type;

1-bit processor means, connected directly to the program memory means, for executing commands to be executed that are sequentially read from the program memory means and transmitting the commands to be executed to the first processor means if the commands to be executed are of the sequence control program type to be executed by the first processor means;

a random access memory (RAM) for temporarily storing data;

a read only memory (ROM) for storing a self-diagnostic program;

a communication interface for communicating with a host computer;

an I/O bus through which I/O boards for transferring and receiving multiple information are connected;

an I/O interface connected to the I/O bus; and an internal bus for mutually connecting the first processor means, the 1-bit processor means, the RAM, the ROM, the communication interface, and the I/O interface.

2. The programmable controller as claimed in claim 1, wherein at a start-up time an I/O driver stored in the processor board stores a process definition table for storing in a table format information read from an I/O board regarding a board ID, a type of interface of the I/O board, the number of channels, a command register address, a buffer address, a data register address, an address for designating special processing when special processing is needed, and wherein the I/O driver refers to the process definition table when effecting a data outputting process.

3. The programmable controller as claimed in claim 1, further comprising:

strobing signal generating means for generating strobing signals provided in the processor board and the I/O boards, wherein when starting a data transfer cycle, the processor board requests a data transfer by transmitting to one I/O board a number of strobing signals, each strobing signal making transmission of an information frame effective, and wherein the one I/O board receiving the data transfer request transmits to the processor board a number of other strobing signals, each strobing signal making transmission of an information frame effective, thus ending the data transfer cycle.

4. A programmable controller as claimed in claim 1, further comprising one or more abnormality detecting circuits that correspond to different kinds of abnormalities which can arise, wherein the first processor means receives an abnormality detecting signal as an interrupt signal and stores, in a table format in memory, time data from an internal timer regarding the occurrence of the detected abnormality and a description of the detected abnormality.

5. A programmable controller as claimed in claim 1, further comprising:

means for assigning signal names to circuit elements when creating ladder circuits;

means for corresponding the signal names to addresses in accordance with a preset signal name-to-address correspondence table; and means for sequentially assigning detailed addresses corresponding to the signal names, wherein an I/O refresh process in a sequence control process routine is omitted when an I/O board is not connected with the controller.

6. A programmable controller as claimed in claim 1, wherein a series of sequence control operations are split into blocks corresponding to several steps when programming a ladder program, and wherein the ladder program is stored and executed block by block by storing in a final substep of each block a command for stopping the execution of that block and a command for specifying the block to be executed next.

7. A programmable controller as claimed in claim 1, further comprising:

means for storing a comment file for storing comments added to ladder circuits in a ladder program generated in a ladder language and corresponding step numbers of the ladder circuit concerned; and means for storing a circuit/comment table in which the step numbers of the ladder circuit concerned correspond to comment numbers in the comment file, wherein the circuit comments, the step numbers and the ladder circuits are read from a programming tool.

* * * * *